United States Patent
Waters et al.

(10) Patent No.: US 11,781,895 B2
(45) Date of Patent: Oct. 10, 2023

(54) FLUID FLOW ANALYSIS AND MANAGEMENT

(71) Applicant: Buoy Labs, Inc., Santa Cruz, CA (US)

(72) Inventors: Keri Waters, Santa Cruz, CA (US); Andrew Stephen Pike, Santa Cruz, CA (US)

(73) Assignee: Buoy Labs, Inc., Santa Cruz, CA (US)

( * ) Notice: Subject to any disclaimer, the term of this patent is extended or adjusted under 35 U.S.C. 154(b) by 596 days.

(21) Appl. No.: 15/904,290

(22) Filed: Feb. 23, 2018

(65) Prior Publication Data

US 2019/0265091 A1  Aug. 29, 2019

(51) Int. Cl.
  *G01F 15/063* (2022.01)
  *H04W 4/38* (2018.01)
  (Continued)

(52) U.S. Cl.
  CPC ............ *G01F 15/063* (2013.01); *H04W 4/38* (2018.02); *H04W 4/70* (2018.02); *H04W 92/16* (2013.01)

(58) Field of Classification Search
  CPC ....... G01F 15/063; H04W 4/38; H04W 92/16; H04W 4/70
  See application file for complete search history.

(56) References Cited

U.S. PATENT DOCUMENTS 3,114,261 A   12/1963 Dillon et al.
3,719,073 A   3/1973 Mahon
(Continued)

FOREIGN PATENT DOCUMENTS

CN   105758470 A   7/2016
DE   19601609 A1   7/1997
(Continued)

OTHER PUBLICATIONS

Wikipedia: Timestamp <https://en.wikipedia.org/w/index.php?title=Timestamp&oldid=839237771> version dated May 2, 2018. (Year: 2018).*

(Continued)

*Primary Examiner* — Ricky Go
(74) *Attorney, Agent, or Firm* — Greenberg Traurig, LLP; Ryan D. Sharp; David J. Dykeman

(57) ABSTRACT

A system and method for observing fluid flow behavior at a selected site, deriving judgments and recommendations, and further communicating data, judgments and recommendations. The system receives flow rate information, derives a time series of fluid flow events therefrom, identifies compound events consisting of contemporaneous events, disaggregates compound events by application of an unsupervised model, and applies the unsupervised model to derive a solution space of a subset sum problem-type, wherein historical data of the observed fluid flow is not necessarily accessed. The system derives a prior probability of events associated with an event conditional upon event features and attributes, and thereupon estimates prior probabilities based upon user-derived labels for events from many external sites; and/or derives a posterior probability of labels associated events, conditional upon event features and attributes, and estimates posterior probabilities based upon both prior updated information relating to the selected site and a priori calculated probabilities.

19 Claims, 15 Drawing Sheets

(51) Int. Cl.
*H04W 92/16* (2009.01)
*H04W 4/70* (2018.01)

(56) References Cited

U.S. PATENT DOCUMENTS

| | | | |
|---|---|---|---|
| 4,197,809 A | 4/1980 | Johnson | |
| 4,291,583 A | 9/1981 | Buike | |
| 5,005,426 A | 4/1991 | Lew | |
| 5,500,882 A | 3/1996 | Eifert | |
| 6,155,102 A | 12/2000 | Toma et al. | |
| 6,672,154 B1 | 1/2004 | Yamagishi et al. | |
| 6,970,808 B2 | 11/2005 | Abhulimen et al. | |
| 7,000,463 B1 | 2/2006 | Shajii et al. | |
| 7,202,800 B2 | 4/2007 | Choi | |
| 7,274,996 B2 | 9/2007 | Lapinski et al. | |
| 7,330,796 B2 | 2/2008 | Addink et al. | |
| 7,376,522 B2 | 5/2008 | Lapinski et al. | |
| 7,412,336 B2 | 8/2008 | Larson | |
| 7,657,347 B2 | 2/2010 | Campbell et al. | |
| 7,905,831 B2 | 3/2011 | Noguchi et al. | |
| 8,105,279 B2 | 1/2012 | Mernoe et al. | |
| 8,457,908 B2 | 6/2013 | Patel et al. | |
| 8,531,303 B2 | 9/2013 | Pham et al. | |
| 8,548,755 B2* | 10/2013 | Takemura | G01F 1/667 702/50 |
| 8,800,384 B2 | 8/2014 | Wootten | |
| 8,866,634 B2 | 10/2014 | Williamson et al. | |
| 8,904,882 B2 | 12/2014 | Mertmann | |
| 8,994,551 B2 | 3/2015 | Pitchford et al. | |
| 9,019,120 B2 | 4/2015 | Broniak et al. | |
| 9,078,050 B2 | 7/2015 | Makgill, Jr. et al. | |
| 9,200,939 B2* | 12/2015 | Iwamoto | G01F 15/0755 |
| 9,383,237 B2 | 7/2016 | Wiklund et al. | |
| 9,410,833 B1 | 8/2016 | Leaders et al. | |
| 9,552,143 B2 | 1/2017 | Javey et al. | |
| 9,664,589 B2 | 5/2017 | Horne et al. | |
| 9,702,731 B2 | 7/2017 | Gopinath | |
| 2006/0168611 A1 | 7/2006 | Fima | |
| 2007/0201192 A1 | 8/2007 | McGuire et al. | |
| 2008/0282817 A1 | 11/2008 | Breed | |
| 2009/0128326 A1 | 5/2009 | Hong | |
| 2010/0138167 A1* | 6/2010 | Bessyo | F23N 1/002 702/45 |
| 2011/0298635 A1 | 12/2011 | Yip | |
| 2015/0160099 A1* | 6/2015 | Hamouz | G01K 17/06 702/45 |
| 2015/0377667 A1 | 12/2015 | Ahmad et al. | |
| 2016/0161310 A1* | 6/2016 | Leaders | G01F 1/663 702/48 |
| 2016/0163177 A1* | 6/2016 | Klicpera | G08B 21/18 137/59 |
| 2016/0313156 A1 | 10/2016 | Croft et al. | |
| 2017/0131174 A1* | 5/2017 | Enev | E03B 7/071 |
| 2017/0184429 A1 | 6/2017 | Kallesoe | |
| 2017/0292893 A1 | 10/2017 | Bunker et al. | |
| 2017/0370754 A1* | 12/2017 | Croteau | G01F 5/00 |
| 2018/0279022 A1 | 9/2018 | Adler et al. | |
| 2018/0356265 A1 | 12/2018 | Waters et al. | |

FOREIGN PATENT DOCUMENTS

| | | |
|---|---|---|
| JP | 2003130696 A | 5/2003 |
| KR | 101630768 B1 | 6/2016 |
| WO | 0066979 A | 11/2000 |
| WO | 2010146403 A1 | 12/2010 |
| WO | 2017118834 A1 | 7/2017 |
| WO | 2018027292 A1 | 2/2018 |
| WO | 2018074625 A1 | 4/2018 |

OTHER PUBLICATIONS

"Buoy Installation Guide," Buoy Labs, Inc, Sep. 12, 2017, 12 pp.
"Buoy Quick Start Guide," Buoy Labs, Inc, Sep. 29, 2017, 20 pp.
"Resideo acquired Buoy!," accessed from https://www.buoy.ai/, on or about May 22, 2019, 9 pp.
"Buoy Labs," accessed from https://www.buoy.ai/ on or about May 22, 2019, 6 pp.
U.S. Appl. No. 29/612,637, filed Aug. 2, 2017, naming inventor Waters.
U.S. Appl. No. 15/973,360, filed May 7, 2018, naming inventors Waters et al.
Prosecution History from U.S. Appl. No. 15/973,360, dated Sep. 17, 2020 through Nov. 9, 2021, 80 pp.
Response to Advisory Action dated Nov. 9, 2021, from U.S. Appl. No. 15/973,360, filed Jan. 6, 2022, 17 pp.
Office Action from U.S. Appl. No. 15/973,360 dated Jun. 27, 2022, 14 pp.
Response to Office Action dated Jun. 27, 2022 from U.S. Appl. No. 15/973,360, filed Sep. 27, 2022, 11 pp.

* cited by examiner

FLUID FLOW ANALYSIS AND MANAGEMENT

FIELD OF THE INVENTION

The present invention is in the field of fluid management, flow rate measurement, and leak detection, including but not limited to systems, networked and structures circulating or containing fluids consisting of or comprising water.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The deployment of fluid flow detection and measurement devices are increasing in many industrial, civil, consumer and business settings. The rationale for these deployments often include one or more of the intentions of reducing fluid volume usage and/or purchase costs, providing feedback to enable more efficient fluid usage and/or consumption practices, and enabling reductions in ecological burdens of use or consumption of a fluid, wherein conservation and efficacious use of potable water supplies is widely considered to be of preeminent concern.

It is noted that several manufacturers currently market prior devices that measure and/or merely detect fluid flow at input nodes, output nodes, and/or internal nodes at a plumbing system positioned at a real estate property (hereinafter, "property"). Some of these devices are configured to wirelessly transmit measurements and/or indications of fluid flow into, out of, or within a selected plumbing system. These wireless transmissions are generally available for receipt by commercially available electronic communications devices configured for communications conforming to at least one suitable BLUETOOTH wireless technology standard for exchanging data over short distances using short-wavelength UHF radio waves in the ISM band from 2.4 GHz to 2.485 GHz as provided by the Bluetooth Special Interest Group of Kirkland, Wash., such as an IPHONE 7™ marketed by Apple, Inc. of Cupertino, Calif. (hereinafter, "iPhone 7"), a MACBOOK AIR™ marketed by Apple, Inc. of Cupertino, a Galaxy mobile computing device designed, as marketed by Samsung Electronics of Samsung Digital City of the Republic of Korea, and other suitable electronic communications devices known in the art. Alternatively or additionally, certain prior art fluid flow measurement or detection devices broadcast flow detection and/or flow measurement data in conformance with a standard WIFI™ technology (hereinafter, "WiFi") that enables receipt of this detection and measurement data by wireless local area networking devices configured in conformance with a suitable 802.11 standard provided by the Institute of Electrical and Electronics Engineers (hereinafter, "IEEE") of Piscataway, N.J., such as the aforementioned commercially available electronic communications devices.

Certain prior art fluid flow information systems require, upon an installation of a flow detection or measurement device, a system teaching phase wherein preferably each fluid accessing device or fixture of an instant plumbing system be individually and separately cycled through a duty phase whereby this type of prior art system records and labels the observed and related behavior of the plumbing system as informed by event identifications provided by one or more users. In an exemplary context of a domestic plumbing system, for optimal water usage modeling, this prior art method depends upon a user or users both (1.) separately triggering a learning event duty cycle instantiation of each toilet and water accessing fixture of the plumbing system of interest, and (2.) thereafter performing an explicit labeling of each recorded learning event data set to indicate the duty cycle action source or source type that generated the learning event data as captured and provided by a communicatively coupled flow detection or measurement device or devices. Moreover, certain prior art systems rely upon a user explicitly labeling usage examples of a shower, bath or kitchen sink behavior that is not automatically performed by an fixture or plumbing fixture, e.g., a toilet or an automatically refilling water tank. These prior art systems thus place an informational burden upon, and require a behavioral performance by, a user or users that are each most critically required incident to an installation of such a prior art fluid flow information system.

In another area of art, data science offers approaches to predictive modeling based on externally acquired systems behaviors, but the prior art wholly fails to motivate, anticipate or optimally apply (1.) unsupervised modeling to derive solution spaces of a subset sum problem-type; (2.) partitioning of compound events; (3.) supervised methodology to derive supervised event classifications at least partly from locally generated fluid flow information, remotely generated fluid flow measurements and event data, and received user judgments in combination; (4.) applying supervised unsupervised event identification to fluid flow rate measurements received from a site-specific plumbing system; and (5.) applying supervised or unsupervised event classifications to fluid flow rate measurements received from a site-specific plumbing system.

It is therefore an object of the invented method to apply analytical techniques to identify and/or derive a time series of fluid flow information to manage fluid usage and/or fluid consumption of a site-specific plumbing system, including but not limited to water usage.

It an optional object of the invented method to apply externally acquired information to support analyzing, predicting, enabling and/or managing fluid usage and/or fluid consumption of a site-specific plumbing system.

SUMMARY AND OBJECTS OF THE INVENTION

Towards these and other objects of the method of the present invention (hereinafter, "the invented method") that are made obvious to one of ordinary skill in the art in light of the present disclosure, the present invention provides the invented method and a system (hereinafter, "the invented system") a system and method for observing fluid flow behavior at a selected site, deriving judgments and recommendations, and further communicating data, judgments and recommendations to a user and/or a designated network address or via an identified user account.

According to optional aspects of still alternate preferred embodiments of the invented method, the invented system receives flow rate information, derives a time series of fluid flow events therefrom, identifies compound events consisting of contemporaneous events, disaggregates compound events by application of an unsupervised model, applies the unsupervised model to derive a solution space of a subset sum problem-type, wherein historical data of the observed fluid flow is not necessarily accessed, and optionally communicates findings and information to a user and/or a designated network address or via an identified user account.

Additional optional aspects of the invented method disaggregate time-series data generated by a flow rate sensor to interpret the data as comprising fluid flow caused by two or more events. Disaggregation of a time-series of data, also called non-intrusive load monitoring in the field of energy management and conservation, involves taking an aggregated signal, for example the observed flow rate of a plumbing system measured over a continuous episode of time as expressed as a time-series of data by a water meter, and separating a waveform derived from this time-series of data into separate waveforms of water drawn by two or more appliances or fixtures of a same plumbing system. These optional aspects of the invented method review received data to identify "edges" of fluid flow rate change and that may indicate whether an individual fixture started or stopped drawing water, or other fluid. The amplitude of these edges are significantly beyond the range of observed noise in monitored water flow signal. There is sometimes little need to distinguish whether an edge is indeed a new source of water usage, or just an expected fluid flow variation of an appliance, e.g., a user or machine adjusts the flow rate of a faucet. In certain simple cases that exhibit a relatively constant flow rate, this determination can be made by an application of a subset sum problem; whereby an event must return to its same baseline value to be considered concluded by the invented device. In more complicated cases, the subset sum test is resolved after an event completes.

The invented device further optionally comprises a supervised learning approach. In particular, fluid flow pattern matching may be performed by the invented device to compare an evolving signal to a pre-trained and pre-labeled library of observed water events. The invented method optionally applies fluid flow pattern matching on the basis of one or more of the following qualities: (1.) flow rate; (2.) changes in fluid flow rate from baseline fluid flow rate; (3.) preceding usage fluid flow rate; (4.) fluid flow duration; (5.) fluid flow volume; and/or (6.) fluid flow rate waveform shape matching. Optionally, where the geometry shape of a fluid flow rate derived from a time series of fluid flow measurement data, waveform shape matching may be parameterized numerically on the basis of one or more of the following parameters: (1.) waveform area, i.e., volume; (2.) waveform perimeter (duration); (3.) total variation of the derived waveform; (4.) statistical moments of the derived waveform, e.g., mean, variation, skewness, and kurtosis; (5.) waveform representations, e.g., Fourier coefficients or wavelet coefficients; (6.) spectral or vibration characteristics, i.e., generalized waveform coefficients; and/or (7.) subsequence or partial waveform matching.

It is understood that the term "unsupervised learning" is the machine learning task of inferring a function to describe hidden structure from "unlabeled" data, wherein emphasis is placed on density estimation and clustering.

It is also understood that the term "supervised learning" is the machine learning task of inferring a function from labeled training data with an emphasis placed on classification and prediction in these machine learning processes.

Optional aspects of unsupervised learning employed by certain alternate preferred embodiments of the invented method include (a.) disaggregating fluid flow data into discrete events, and (b.) defining and learning features that describe important discriminative attributes of fluid flow events and fluid flow event types. Attributes optionally considered by unsupervised learning applications of the invented method include: (1.) Basic attributes, e.g., fluid flow rate, duration, volume, and time stamps; (2.) Relational/Latent attributes, e.g., density of pluralities of events, clusters of pluralities of events, clusteriness and cluster size; (3.) probabilistic attributes of events, e.g., frequency of events; and/or (4.) shape attributes of waveforms representing time series measurements of fluid flow, e.g., burstiness.

Optional aspects of supervised learning employed by certain still other alternate preferred embodiments of the invented method include; (1.) user-defined labels; (2.) modeling to predict user-labeled based on event attributes; (3.) when certain alternate preferred embodiments of the invented device is first installed at a property, relational/latent/probabilistic attributes don't exist, then establish prior probability based on Bayesian learning; and/or (4.) waveform pattern matching to directly identify and/or disaggregate events expressed as time series measurements based on comparison to a learned library of archetypical events.

Additional optional aspects of supervised learning employed by certain still other alternate preferred embodiments of the invented method include: (1.) Identifying fluid flow rate edges in time series of aggregate flow rate; (2.) calculating the change in magnitude of the flow rate at that examined edge (delta): (3.) as the examined event proceeds, check if a combination of the delta values satisfies the subset sum problem; if so, subtract out event between those two edges, and if not, wait until an event finishes.

Yet additional optional aspects of unsupervised learning employed by certain still other alternate preferred embodiments of the invented method include calculating basic attributes of one or more fluid flow event, and/or data exists for the observed plumbing system, cluster data to get density/relational variables.

Even additional optional aspects of supervised learning classification employed by certain yet other alternate preferred embodiments of the invented method include: (1.) collecting user-defined labels for some events; (2.) using event attributes to predict the user-defined labels, using a pre-trained supervised learning model, whereby such supervised learning models are trained off-line using a subset of all the user-labeled data and the goal is to predict a functional relationship/mapping between the attributes of one or more fluid flow events and labels; and/or (3.) the supervised model might output a list of probabilities that an selected fluid flow event belongs to all different events, whereby the invented system then optionally chooses the most likely class/label based on this model.

Optional aspects of supervised learning pattern matching in time series employed by certain yet other alternate preferred embodiments of the invented method include: (1.) detecting edges as fluid flow rate data is received; (2.) if events do not satisfy subset sum criteria, or an event has not yet ended and there is not enough information about the complete event, then: (a.) compare the time-series after an edge against a pre-trained and pre-labeled library of event descriptions, (b.) compute a metric describing the "goodness of fit" of partial matching between the current event and a selected library event description, and (c.) select the library event description with the best partial matching score, and assign a label of the best matching library event description to a record of the current event instance.

According to additional optional aspects of still alternate preferred embodiments of the invented method, the invented system derives a prior probability of events associated with an event conditional upon event features and attributes, and thereupon estimates prior probabilities based upon user-derived labels for events from many external sites.

The invented method additionally, alternatively or optionally includes deriving a posterior probability of labels associated events, conditional upon event features and attributes, and estimating posterior probabilities based upon both information relating to the selected site and a priori calculated probabilities.

Various alternate preferred embodiments of the invented method provide an invented system that includes one or more of the following elements or aspects: (1.) a system-distributed architecture comprising a plurality of computational nodes, and a DBMS that comprises a federated database stored in distinguishable data groupings within at least two nodes of the plurality of computational nodes; (2.) additional machine-executable instructions that operationally direct the device to assign a plurality of distinguishable attributes to a plurality event, wherein one or more distinguishable attributes are optionally selected or optionally partially derived from (a.) a flow parameter group consisting of a flow duration value, an average flow rate value, and a fluid volume value, (b.) a temporal parameter group consisting of a time stamp value, an hour value of a nominal day, a day identifier of a nominal week, and a day and month value of a nominal year, (c.) a fluid flow shape parameter group consisting of a measure of consistency of flow volume, a ramp-up measurement, a ramp-down measurement, and a burstiness value, (d.) a probabilistic parameter of the plumbing system selected from the probabilistic parameter group consisting of a value of relatively frequency of occurrence of a particular duration, a value of relatively frequency of occurrence of a flow rate value, and a value of relatively frequency of occurrence of a fluid volume of the plumbing system, and/or (e.) a stochastic parameter of the plumbing system selected from the stochastic parameter group consisting of a value of relatively frequency of occurrence of a selected event at a particular time of day and a value of relatively frequency of occurrence of a selected event at a particular day.

Various other alternate preferred embodiments of the invented method provide an invented system that optionally further includes additional instructions that operationally direct the invented system to (1.) assign a clusteriness parameter to a derived event, wherein optionally the clusteriness parameter is derived at least partially from one or more event parameters selected from an event parameter group consisting of a flow duration value, a flow volume value, a flow direction value, a directional flow volume displacement value, a flow rate value, and a cluster size value; (2.) validate a classification of a selected event as directed by input from a user interface; to reclassify a selected event as directed by input from a user interface; (3.) accept and record an input from a user interface indicating that an event has been incorrectly disaggregated; (4.) associate events with a plumbing fixture of the plumbing system; (5.) diagnose a probable deficiency in operation of the plumbing fixture; (6.) recommend an action based upon a diagnosed probable deficiency of the plumbing fixture; (7.) to analyze the events to determine a suboptimal water use behavior; (8.) analyze the events and thereupon select and recommend an alternate fluid use behavior description; (9.) analyze the events and thereupon select and recommend an alternate costing fluid use behavior description, wherein the alternate costing fluid use behavior description is optionally derived at least partly from a fluid provider pricing schema; (10.) receive a plurality of user judgments of previously applied event classifications and apply a supervised methodology to derive one or more supervised events classifications at least partly from the previously derived one or more events and/or one or more of the received user judgments of the plurality of user judgments; and/or (11.) apply one or more derived supervised event classifications to the received fluid flow rate measurements of the plumbing system to optionally classify one or more events in view of one or more supervised event classifications, wherein one or more supervised event classifications optionally validate a previously derived event classification.

Various still other alternate preferred embodiments of the invented method provide an invented system that optionally further includes additional instructions that operationally direct the invented system to (1.) access external data from which events are derived, the external data being acquired externally to an observed plumbing system or selected site; (2.) initially derive the time series of fluid flow events from associated data of a DBMS; (3.) acquire and record local data from observations of a plurality of measurements of fluid flow of the observed plumbing system or selected site; (4.) derive a time series of fluid flow event labels from the local data, wherein the derivation of events is calculated at least partly by analysis of the external training data; and/or (5.) derive at least one or more labels at least partly by analysis of both external training data and the local data.

Various yet other alternate preferred embodiments of the invented method provide an invented system that optionally further includes additional instructions that operationally direct the invented system to (1.) derive a plurality of features of events; (2.) present to a user a representation of one or more events as computationally derived; (3.) receive a user judgment of the classification of the one or more events, wherein the received user judgment is optionally a validation or alternatively a rejection of a previously derived classification; (4.) apply the received user judgment in a following classification of an additional event of the time series of events; and/or (5.) correct a previously derived and recorded label of an event in view of the received user judgment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Definition of Certain Terms

The scope of meaning of the term "event" as expressed herein denotes a mathematically expressed model of a time series sequence of flow rate values that is defined by a starting point and end point and that share the same baseline flow rate, in combination with a representation of a time series flow rate value pattern occurring between the starting point and end point of the same event definition.

The scope of meaning of the term "event instance" as expressed herein includes a discrete period time wherein fluid is flowing within a plumbing system and the measured time series flow rate of the event instance matches a flow rate pattern described by a previously stored representation of an event.

The scope of meaning of the term "fixture" as expressed herein includes water consuming appliance equipment, fluid accepting machinery, fluid inlets, fluid outlets, dish washers, clothes washers, faucets, sinks, toilets, water softener devices and bath tubs, and fluid showers.

The scope of meaning of the term "burstiness" as expressed herein includes a slope of a flow rate (in volume unit/time unit/time unit) on the processional and receding ends of an event instance.

The scope of meaning of the term "clusteriness" as expressed herein denotes a continuous quantity that refers to concentration in relative point density in multidimensional feature space.

The scope of meaning of the term "cluster size" as expressed herein denotes a property intrinsic to a cluster of points that defines the "size", "spread", or "volume" of these points in multidimensional feature space.

The scope of meaning of the term "unsupervised learning" as expressed herein identifies one or more techniques in machine learning where data points have no dependent quantity or categorical label, and the goal of application of the unsupervised learning process is to optimize a loss function based on the data points' independent features and independent attributes to find similarities and differences between data points.

The scope of meaning of the term "supervised learning" as expressed herein identifies machine learning techniques wherein the goal of application of the supervised learning technique is to optimize a loss function based on a combination of (a.) independent features and/or independent attributes and dependent quantities and/or (b.) dependent categorical labels of a set of data points, i.e. machine learning techniques that determine which independent features best predict the dependent quantities/labels of a set of data.

The scope of meaning of the term "label" as expressed herein identifies a discrete, finite, unordered, categorical variable.

The scope of meaning of the term "fluid" as expressed herein includes liquids, liquid solutions, liquids solutions comprising at least one liquid solvent and particles, water, solutions comprising a water solvent, liquid solutions comprising gases, and gases.

BRIEF DESCRIPTION OF THE FIGURES

The detailed description of some embodiments of the invention is made below with reference to the accompanying Figures, wherein like numerals represent corresponding parts of the Figures.

DETAILED DESCRIPTION

Figure 1:
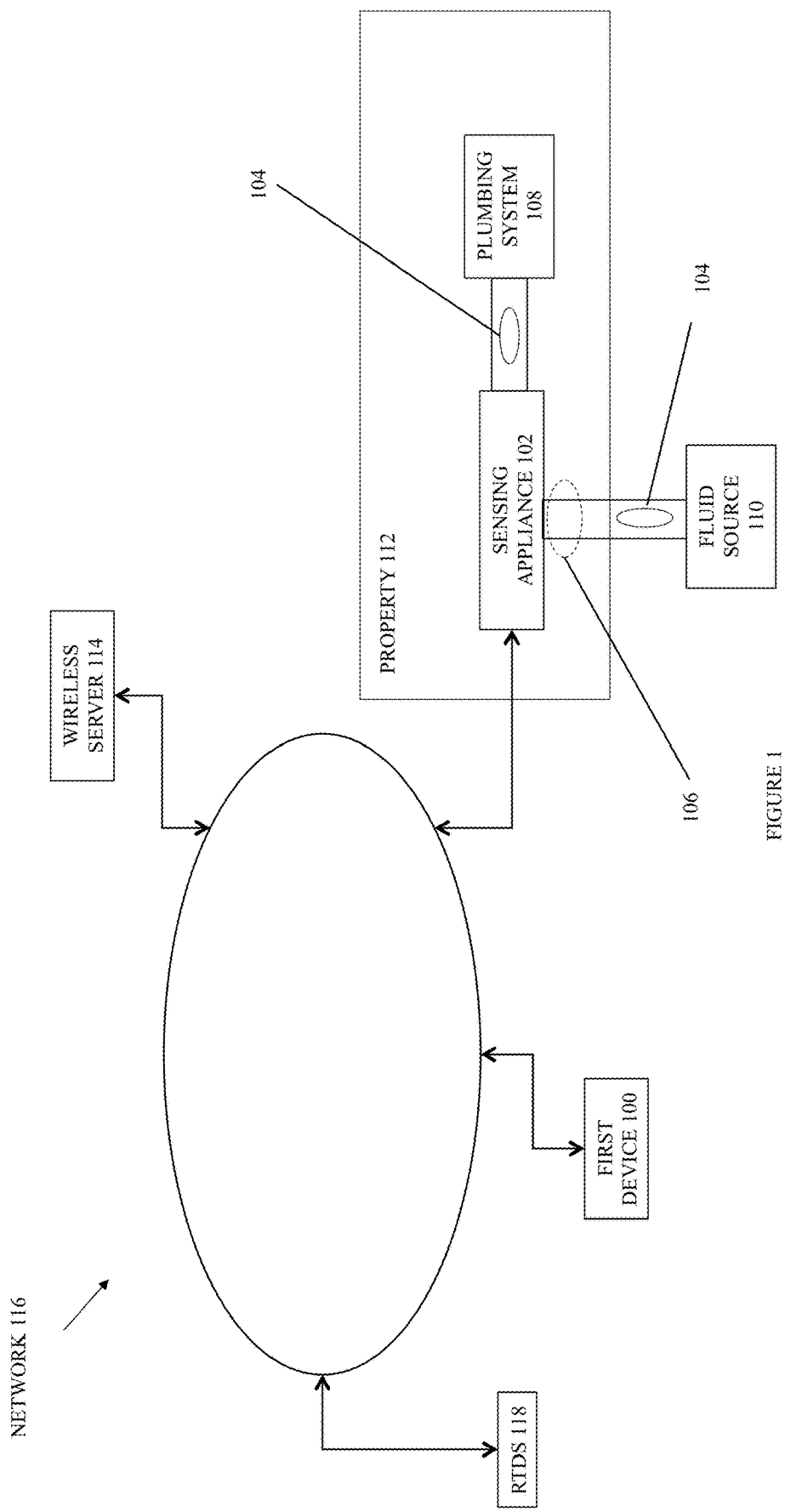
FIG. 1 is a block diagram of a first preferred embodiment of the invented system communicatively coupled with a fluid flow sensing appliance, wherein the fluid flow sensing appliance is positioned to monitor fluid flow at a certain location of a plumbing system positioned or associated with at a property.

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expressions such as "first," "second," or the like used in various embodiments of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/ to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for," "having the capability to," "designed to," "adapted to," "made to," or "capable of." The expression "configured to" may not necessarily mean "specially designed to" in terms of hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

For example, the electronic device 100 may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile appliance, a camera, and a wearable device (e.g., a head-mounted-device (HMD) such as electronic glasses, electronic clothes, an electronic bracelet, an electronic necklace, an electronic accessory, electronic tattoos, or a smart watch).

In some embodiments, the term "electronic device" may describe a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ and PLAYSTATION™), an electronic dictionary, an electronic key, a camcorder, and an electronic photo frame.

According to some embodiments, the electronic device 100 may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Referring now generally to the Figures and particularly to FIG. 1, FIG. 1 is a block diagram of a first preferred embodiment of the invented system 100 (hereinafter, "the first device" 100) communicatively coupled with a fluid flow sensing appliance 102, wherein the fluid flow sensing appliance 102 (hereinafter, "the sensing appliance" 102) is positioned to measure flow of fluid 104 at a first location 106 of a plumbing system 108, wherein the fluid 104 is received from an external fluid source 110. The system 108 is preferably positioned or associated with at an exemplary real estate property 112 (hereinafter, "the property" 112).

The first device 100 is adapted to receive fluid flow volume-rate measurement information by wireless transmission as generated by the sensing appliance 102. The first device 100 is bi-directionally communicatively coupled with a wireless server 114, wherein the wireless server 114 is configured to both (a.) receive fluid flow volume-rate fluid flow measurement information by wireless transmission as generated by the sensing appliance 102, and (b.) transmit this received measurement information to the first device 100 by wireless transmission.

Alternatively or additionally, the wireless server 114 and the first device 100 are bi-directionally communicatively coupled by an electronics communications network 116, whereby the wireless server 114 is further or alternatively configured to both (a.) receive fluid flow volume-rate fluid flow measurement information by wireless transmission as generated by the sensing appliance 102, and (b.) transmit this received measurement information to the first device 100 via the electronics communications network 116 (hereinafter, "the network" 116). It is understood that the network 116 may be or comprise, or be comprised within, the Internet and/or other suitable electronic communications network known in the art. The network 116 further comprises a real time data source 118 that is optionally communicatively accessible by the first device 100 and/or the sensing appliance 102.

The sensing appliance 102 may be or comprise a BUOY (R) consumer water flow detection and monitoring device as marketed by BUOY LABS, of Santa Cruz, Calif. and/or other suitable wireless communications enabled fluid flow measurement device known in the art.

The first device 100 and/or the wireless server 114 may be or comprise a bundled hardware and software informational technology product or system including but not limited to (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an PHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable mobile electronic device, wireless communications device, tablet computer, smartphone, or computational system or electronic communications device known in the art.

Figure 2A:
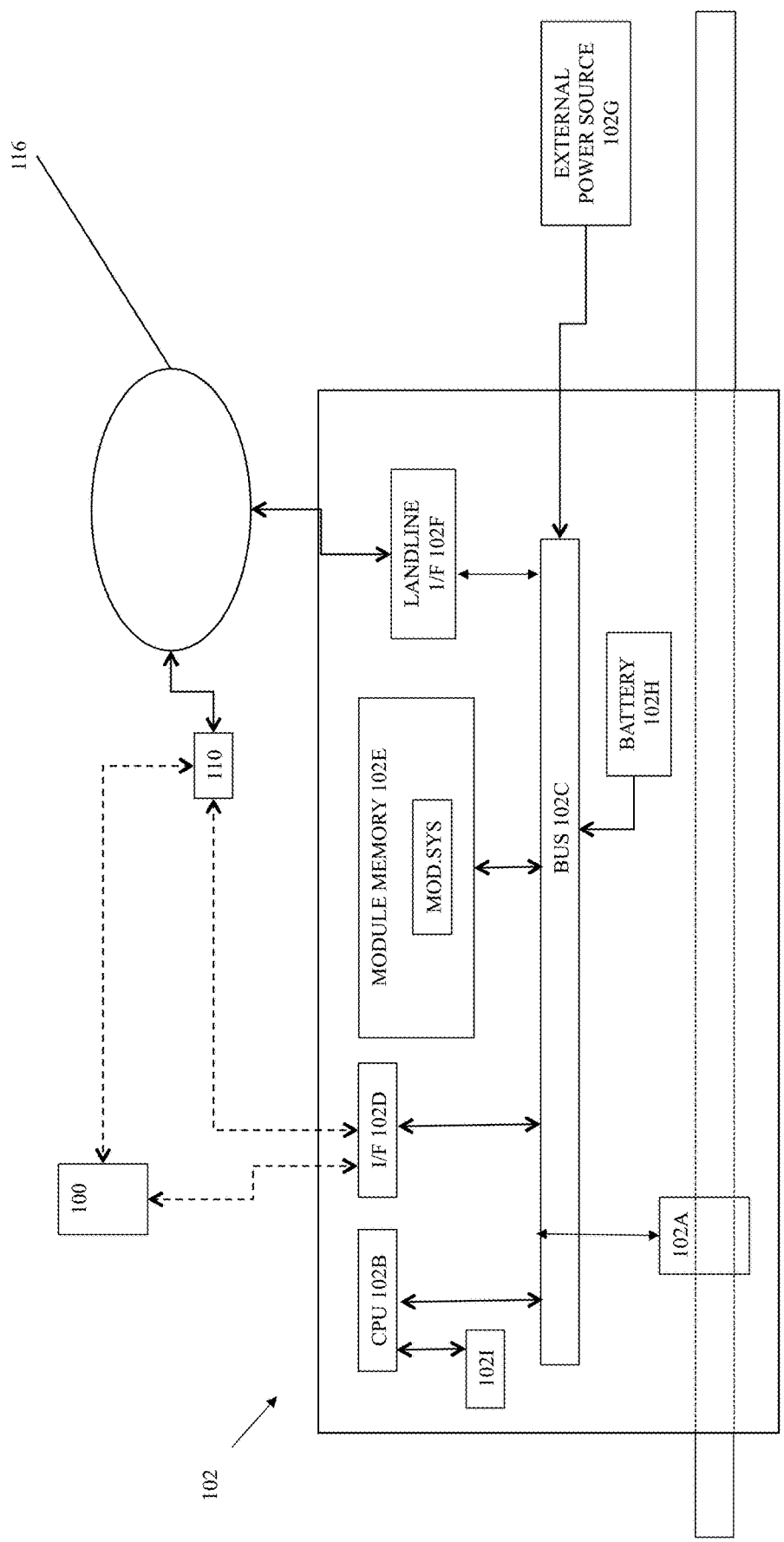
FIG. 2A is a block diagram of the fluid flow sensing appliance of FIG. 1.

Referring now generally to the Figures and particularly to FIG. 2A, FIG. 2A is a block diagram of the sensing appliance 102. The exemplary fluid flow sensing appliance 102 includes a fluid flow-rate measurement module 102A that is preferably positioned inline in the plumbing system 108 at the first location 106. The sensing appliance 102 further includes a central processor unit 102B (hereinafter, "CPU" 102B) communicatively coupled by an internal power and communications bus 102C (hereinafter, "bus" 102C) to the fluid flow-rate measurement module 102A, a bi-directional wireless transceiver module 102D, a memory module 102E, and an optional landline telephonic interface 102F. An external power source 102G and/or an electrical power battery 102H provide electrical energy via the bus 102C to the CPU 102B, the fluid flow-rate measurement module 102A, the wireless transceiver module bi-directional, the memory module 102E, and optionally to the landline telephonic interface 102F. An optional real time clock 102I is communicatively coupled with the CPU 102B external to the bus 102C The memory module 102E contains module software MOD. SYS that directs the CPU 102B to (a.) receive fluid flow measurements from the fluid flow-rate measurement module 102A; (b.) store the fluid flow-rate measurement module 102A in the memory module 102E; (c.) cause the wireless transceiver module 102D to transmit fluid flow measurements received from the fluid flow-rate measurement module 102A via the wireless transceiver module 102D to the first device 100 and/or the wireless server 114; and (d.) alternatively or optionally cause the wireless transceiver module 102D to transmit fluid flow measurements received from the fluid flow-rate measurement module 102A through the landline interface 102F to the first device 100 and/or the wireless server 114 via the network 116.

Figure 2B:
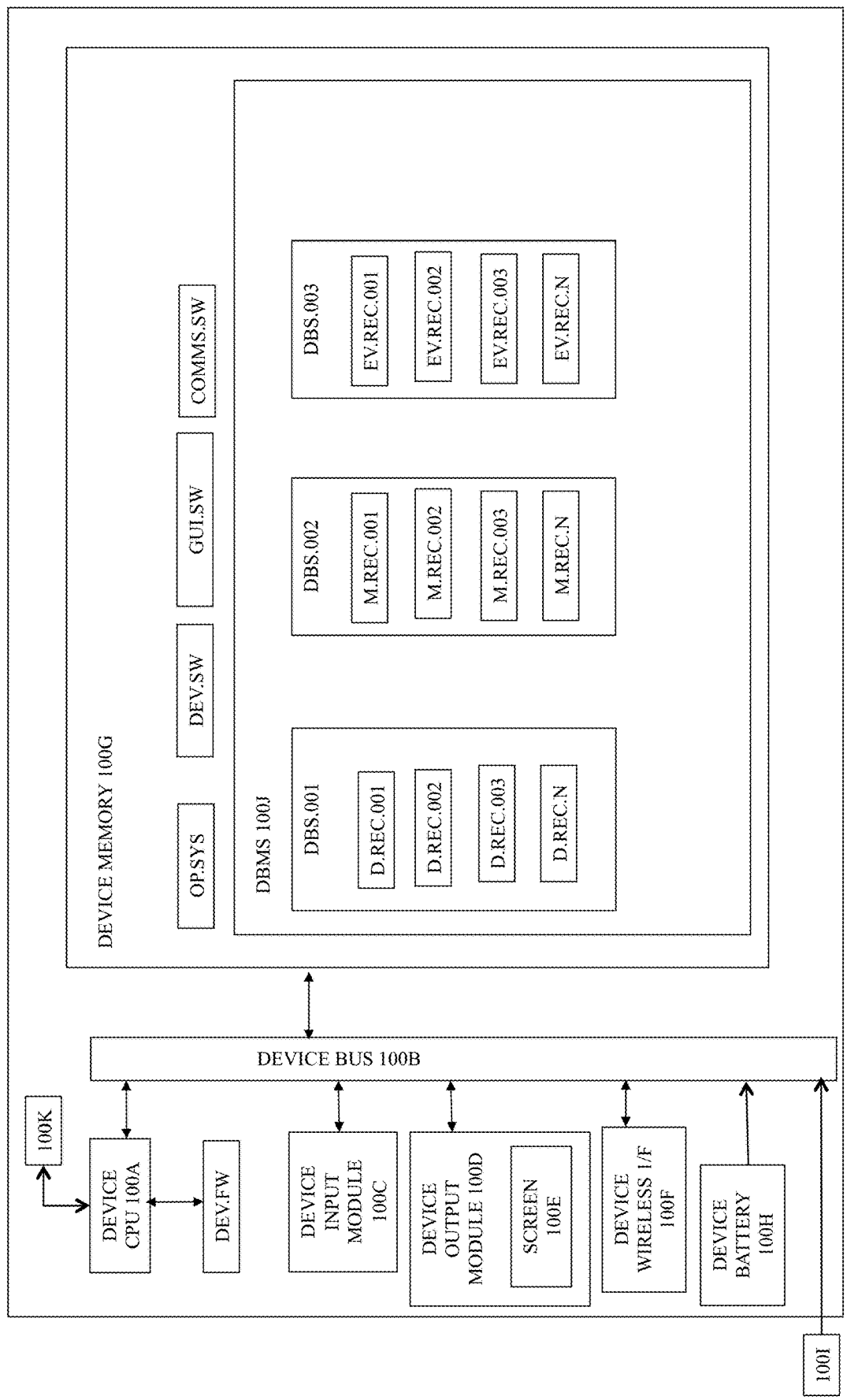
FIG. 2B is a block diagram of the first preferred embodiment of the invented system of FIG. 1.

Referring now generally to the Figures and particularly to FIG. 2B, FIG. 2B is a block diagram of the first preferred embodiment of the first device 100. The first device 100 comprises a device central processing unit 100A that is bi-directionally communicatively coupled by a device power and communications bus 100B (hereinafter, "the device bus" 100B) to a user input module 100C, an output module 100D comprising a display screen 100E, a device wireless interface 100F, and a device memory 100G. An optional device battery 100H provides electrical power via device bus 100B to the device central processing unit 100A (hereinafter, "the device CPU" 100A), the user input module 100C, the output module 100D comprising and the display screen 100E, the device wireless interface 100F, and the device memory 100G. Alternatively or additionally an external power source 100I provides electrical power via device bus 100B to the device CPU 100A, the user input module 100C, the output module 100D comprising and the display screen 100E, the device wireless interface 100F, the device memory 100G, and optionally to the device battery 100H.

The device memory 100G stores an operating system OP.SYS and a device software DEV.SW. The operating system OP.SYS enables the device software DEV. SW to direct the device CPU 100A to cause the first device 100 to execute, generate or perform all, or more than one of, the essential aspects, communications and actions required to instantiate the invented method, and alternatively or additionally instantiate the optional aspects of the invented method, in collaboration with the sensing appliance 102, the network 116 and/or the wireless server 114 and information or commands received from one or more users via the sensing appliance 102, the network 116 and/or the wireless server 114. Alternatively or additionally, a device firmware DEV.FW is communicatively coupled with the device CPU 100A and comprises logic and digitized information sufficient to direct the device CPU 100A to cause the first device 100 to execute, generate or perform all, or more than one of, the essential aspects, communications and actions required to instantiate the invented method, and alternatively or additionally instantiate the optional aspects of the invented method, in collaboration with the sensing appliance 102, the network 116 and/or the wireless server 114 and information or commands received from one or more users via the sensing appliance 102, the network 116 and/or the wireless server 114.

An optional device real time clock 100K is communicatively coupled with the device CPU 100A external to the device bus 100B.

The device memory 100G further preferably stores a graphic user interface software GUI.SW and a communications software COMMS.SW. The graphic user interface software GUI.SW enables the first device to both visually render information via the display screen 100E and receive information and commands from a user or users via the user input module 100C. The communications software COMMS.SW enables the first device 100 to send and receive electronic messages and information to and from the sensing appliance 102 via the device wireless communications interface 100F. The communications software COMMS.SW additionally or alternatively enables the first device 100 to send and receive electronic messages and information to and from the sensing appliance 102 by means of the device wireless communications interface 100F I combination with the network 116 and/or the wireless server 114. The communications software COMMS.SW further additionally or alternatively enables the first device 100 to send and receive electronic messages and information from the real time data source 118 and other suitable electronics communications equipment known in the art by means of the device wireless communications interface 100F I via the network 116.

The device memory 100G further preferably stores a database management system 100J that stores a plurality of databases DBS.001-DBS.N. The database management system 100J (hereinafter, "DBMS" 100J) may be or comprise an object oriented database management system ("OODBMS"), a relational database management system ("RDBMS") and/or an NoSQL database management system, and one or more databases DBS.011-DBS.N, may be or comprise an object oriented database, a relational database and/or an NoSQL database. More particularly, the DBMS 100J may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; the POSTGRESQL™ open source object-relational database management system; and/or a suitable commercially available NoSQL database.

It is understood that the designator ".N" is applied in the present disclosure to indicate an arbitrarily large quantity of items limited only by the operational capacity of a comprising system, memory or equipment.

A first database DBS.001 comprises a plurality of event definition records D.REC.001-D.REC.N, wherein each event definition record preferably defines a unique fluid flow rate time series data pattern that is associated with a particular category indicator or label. It is understood that one or more the event definition records D.REC.001-D.REC.N are authored prior to communication commencing between the first device 100 and the sensing appliance 102, optionally or alternatively, prior to the coupling of the sensing appliance 102 with the plumbing system 108

A second database DBS.002 comprises a plurality of flow rate measurement records M.REC.001-M.REC.N, wherein each of flow rate measurement record M.REC.001-M.REC.N (hereinafter, "measurement record" M.REC.001-M.REC.N) stores both (a.) a fluid flow measurement MEAS.001-MEAS.N originated by the sensing appliance 102, and (b.) an associated unique date-time stamp DTS.001-DTS.N.

A third database DBS.003 stores a plurality of event records EV.REC.001-EV.REC.N, wherein each event record EV.REC.001-EV.REC.N stores an event date-time stamp in association with an event reference to an event definition as stored in event definition record D.REC.001-D.REC.N; the event reference may be a label, a category indicator, or an event definition record identifier D.REC.ID.001-D.REC.ID.N of a unique event record EV.REC.001-EV.REC.N. One or more event records EV.REC.001-EV.REC.N may optionally further store or refer to flow rate measurement records M.REC.001-M.REC.N form which the comprising or referencing event record EV.REC.001-EV.REC.N was derived.

Figure 2C:
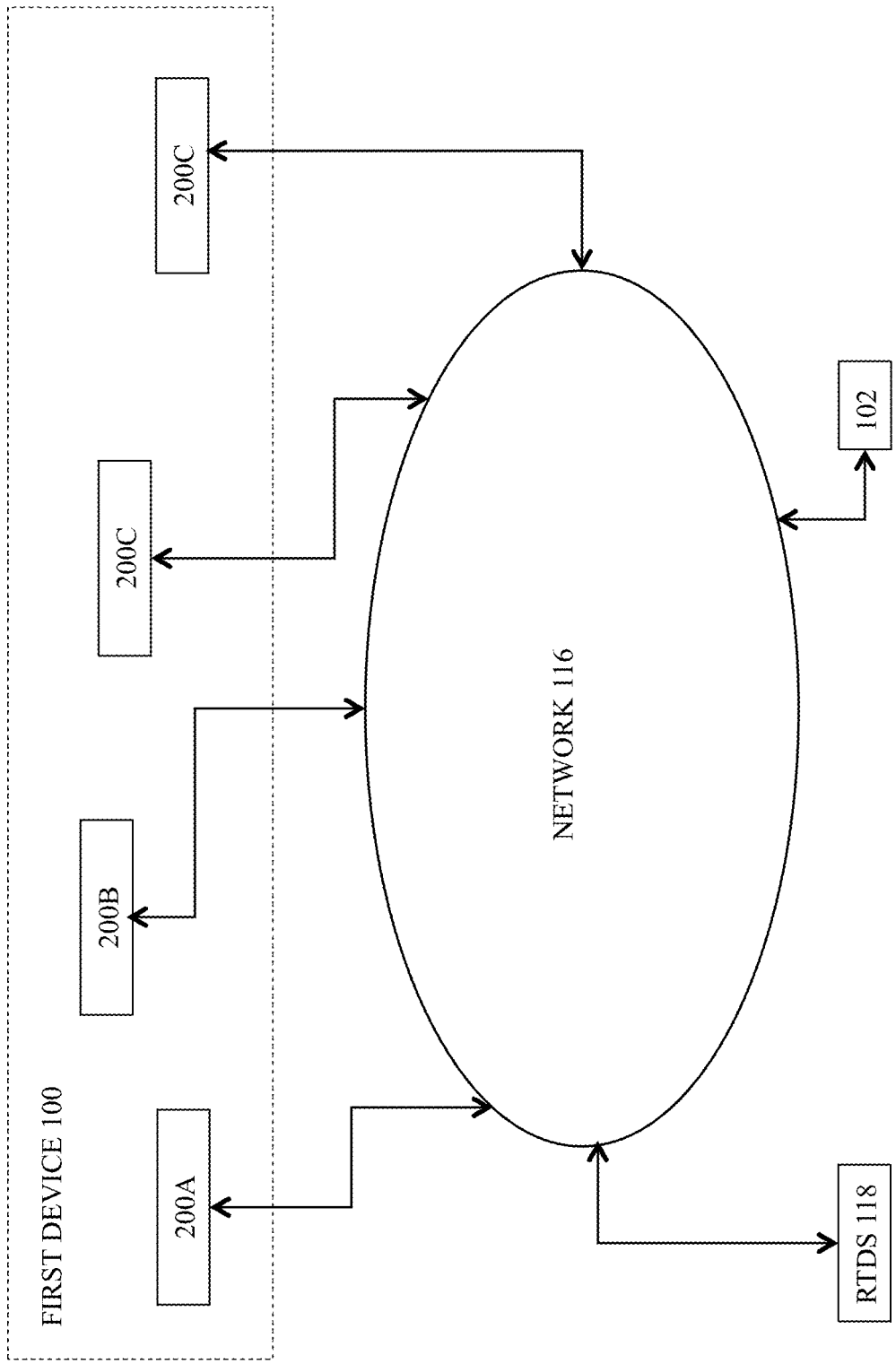
FIG. 2C is a block diagram of an alternate preferred embodiment of the invented system of FIG. 1, wherein a second invented system comprises software, hardware modules, and functional elements in accordance with the invented method that are distributed among a plurality of servers, wherein each server may optionally be directly or indirectly communicatively coupled with the electronic communications network of FIG. 1, whereby certain, or alternatively all of, the aspects and functionalities of the invented method as disclosed herein may be performed by interaction of the distributed software, hardware modules and functional elements.

Referring now generally to the Figures and particularly to FIG. 2C, FIG. 2C is a block diagram of an alternate preferred embodiment of the first invented device 100, i.e., a second invented system 200, wherein the second invented system 200 comprises software, hardware modules, and functional elements instantiated diversely among a plurality of invented servers 200A-200N in accordance with the invented method, wherein one or more invented server 200A-200N may optionally be directly or indirectly communicatively coupled with the electronic communications network of FIG. 1, and certain, or alternatively all of, the aspects and functionalities of the invented method as disclosed herein may be performed by interaction of the invented servers 200A-200N.

One or more of the plurality of invented servers 200A-200N may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the first device 100 and/or the second invented system 200 described herein, may be included or omitted in various embodiments of the first device 100 and/or the second invented system 200, as suitably desired. In some embodiments, the first device 100 and/or the second invented system 200 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Figure 3:
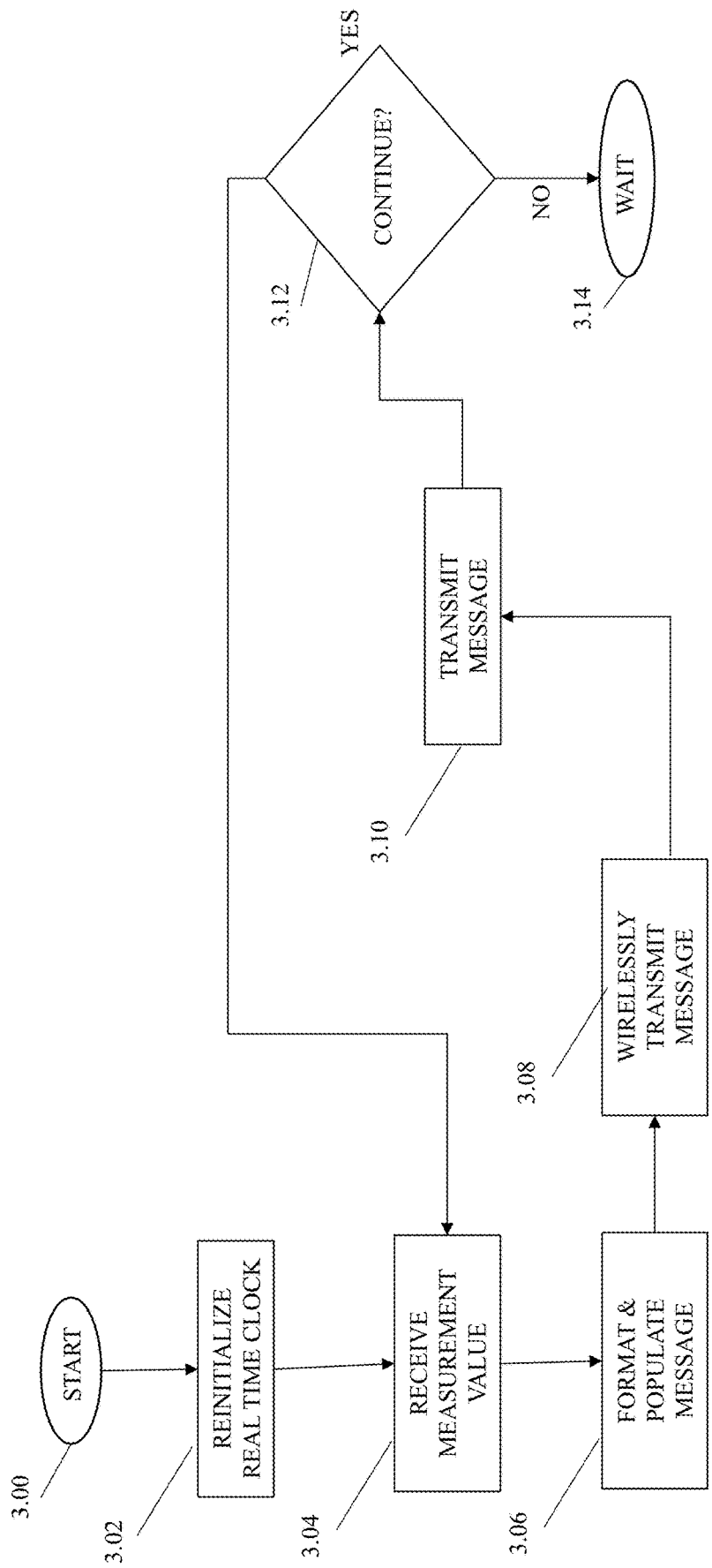
FIG. 3 is a flowchart of actions performed by the fluid flow sensing appliance of FIG. 1 and FIG. 2A and in accordance with the invented method.

Referring now generally to the Figures and particularly to FIG. 3, FIG. 3 is a flowchart of actions performed by the fluid flow-sensing appliance 102. In step 3.00 the sensing appliance 102 boots up and reinitializes its real time clock 102I in step 3.02, optionally performs this reinitialization of the real time clock 102I by correlation with date-time data received from the real time data source 118 via the network 116. In step 3.04 the CPU 102B receives a fluid flow rate value FR.001-FR.N from the fluid flow-rate measurement module 102A. It is understood that the received fluid flow rate measurement value FR.001-FR.N of step 3.04 might be a null value. In step 3.06 the CPU 102B formats a flow rate message M.REC.001-M.REC.N and populates the flow rate message M.REC.001-M.REC.N with the most recently received fluid flow rate measurement value FR.001-FR.N with a current date-time value TDS.001-TDS.N of the real time clock 102I. The sensing appliance 102 transmits the most recently generated and populated flow rate message M.REC.001-M.REC.N in step 3.08 through the wireless transceiver module 102D. Optionally additionally or alternatively the sensing appliance 102 transmits the most recently generated and populated flow rate message M.REC.001-M.REC.N in step 3.10 via the landline telephonic interface 102F.

In step 3.12 the sensing appliance 102 determines whether to return to an additional execution of the loop of steps 3.04 through 3.10 or to proceed to a wait state of step 3.14.

For clarity of explanation, FIGS. 4A, 4B, 5A and 5B are offered to illustrate the task of distinguishing between measurements of singular event instances from occasions of compound events that comprise two or more event instances. It is an optional object of the invented method to enable improved supervised learning and unsupervised learning that improve determinations of pluralities of time series fluid flow measurements as being generated by a single complex event instance or, alternatively, generated by a combination of two or more temporally overlapping event instances.

Figure 4A:
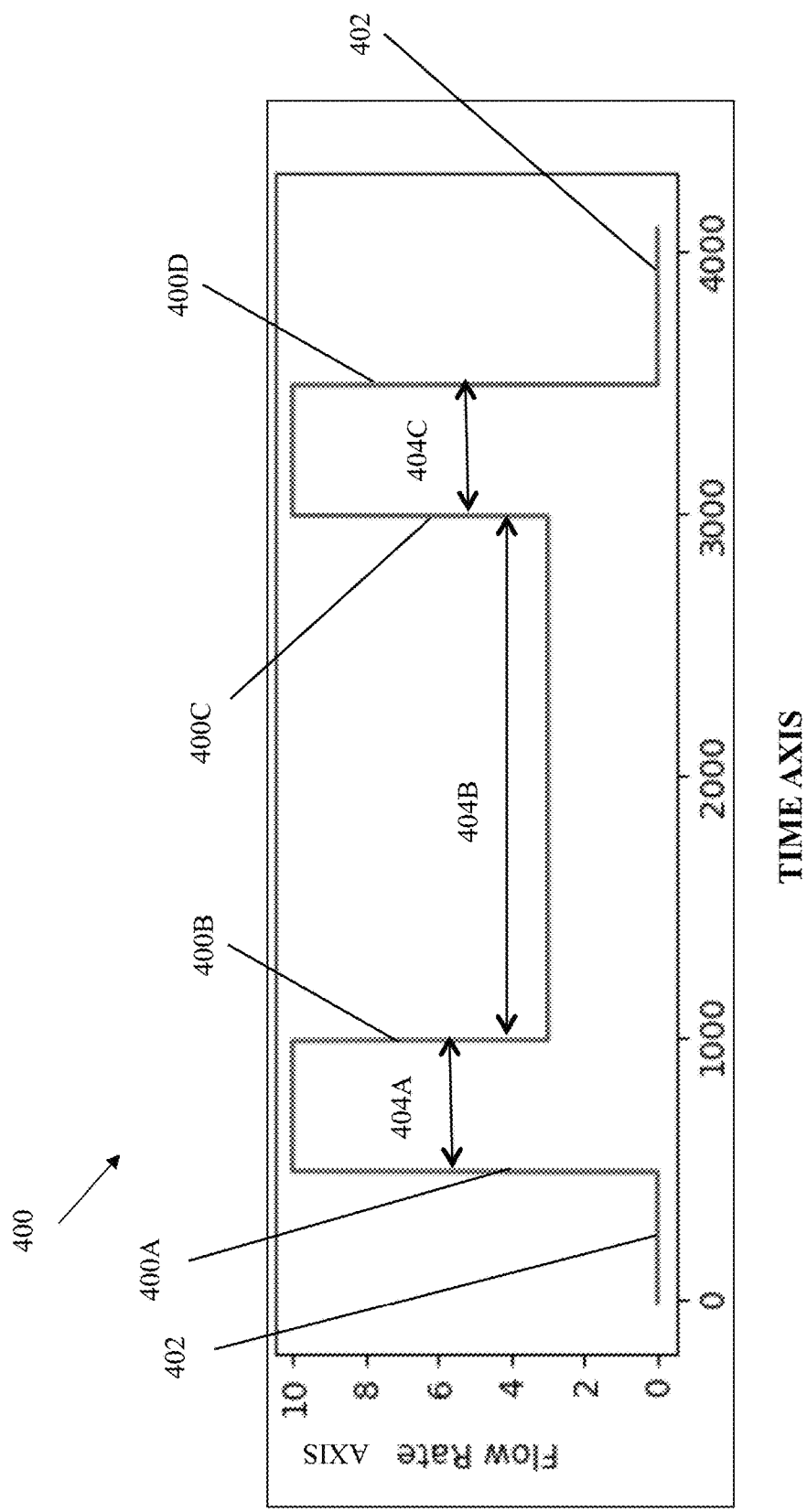
FIG. 4A is a visual representation of a first complex event instance wherein a measured fluid flow rate varies over time.

FIG. 4A is a first visual representation 400 of a first complex event instance wherein a measured fluid flow rate varies over time. The first visual representation 400 presents a first edge 400A that extends above a base line 402 and proceeds over time T through three more edges 400B, 400C & 400D before returning to a fluid flow measurement equal to or less than the fluid flow value of the base line 402. The edges 400A-400D are respectively separated by time lengths 404A, 404B & 404C.

Figure 4B:
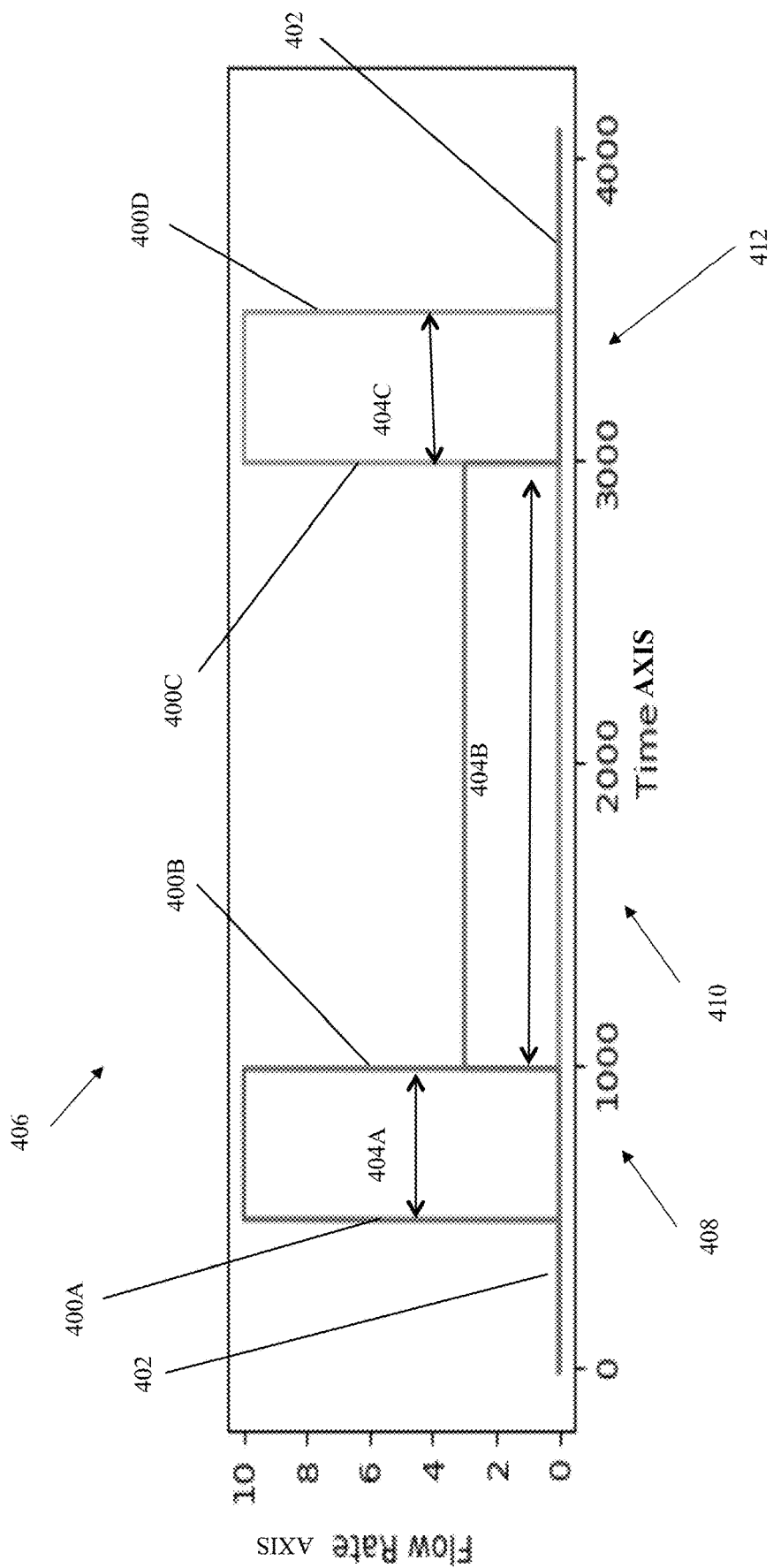
FIG. 4B is a notional representation of a combination of possible distinct combined event instances of the first complex event instance of FIG. 4B.

FIG. 4B is a first notional representation 406 of a proposed combination of three distinct combined event instances 408, 410 & 412 that might comprise the first complex event instance represented in FIG. 4A. In fact, in this example, these three event instances 408, 410 & 412 do not represent actual instances of event instances, and the first visual representation 400 is a representation of a singular complex event instance.

Figure 5A:
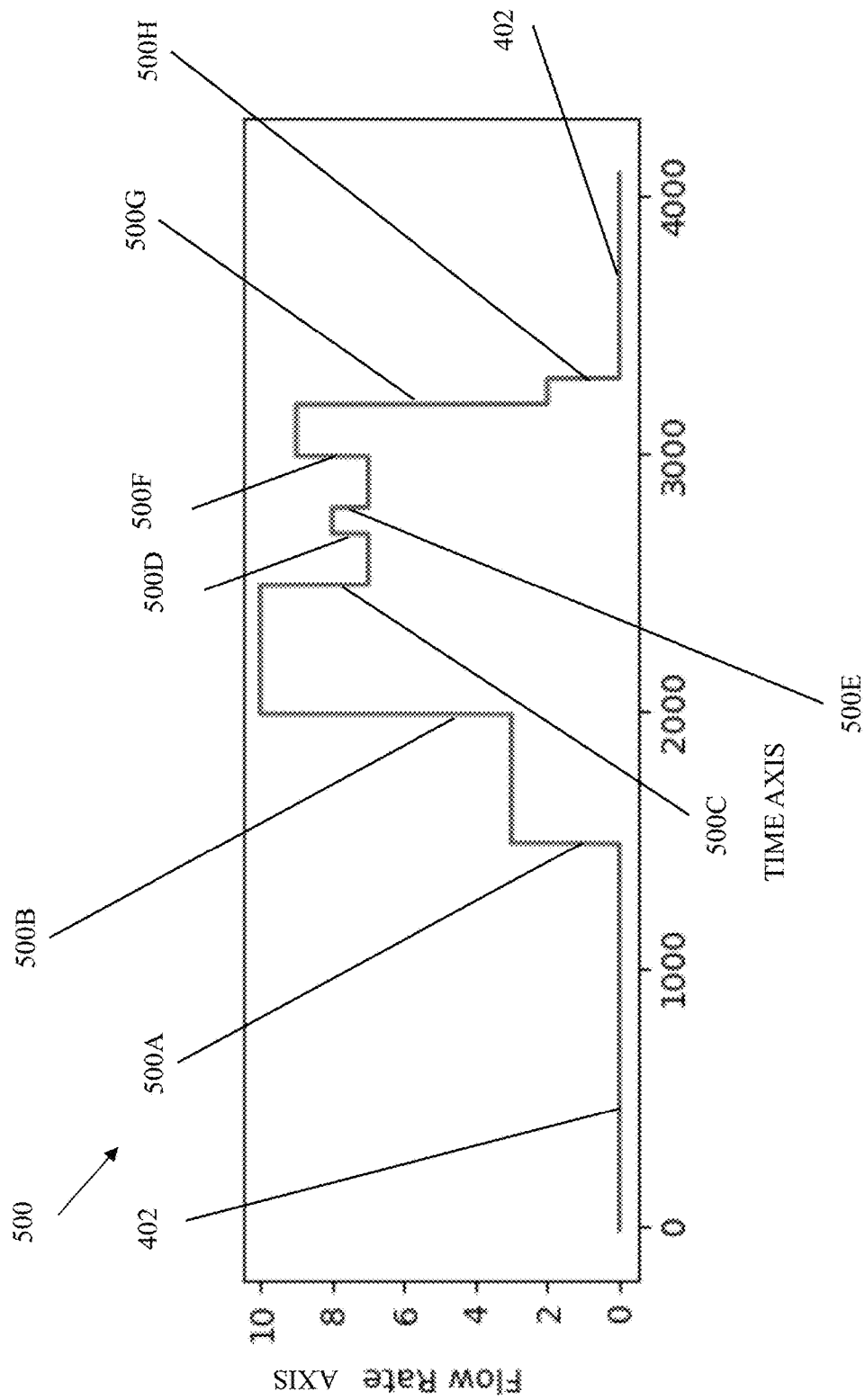
FIG. 5A is a visual representation of a first compound event instance wherein a measured fluid flow rate varies over time.

FIG. 5A is a first compound visual representation 500 of a first compound event instance wherein a measured fluid flow rate varies over a time axis. The first compound visual representation 500 presents a first contributing edge 500A that extends above a base line 402 and proceeds over a time axis through additional edges 500B-500H before returning to a fluid flow measurement equal to or less than the fluid flow value of the base line 402.

Figure 5B:
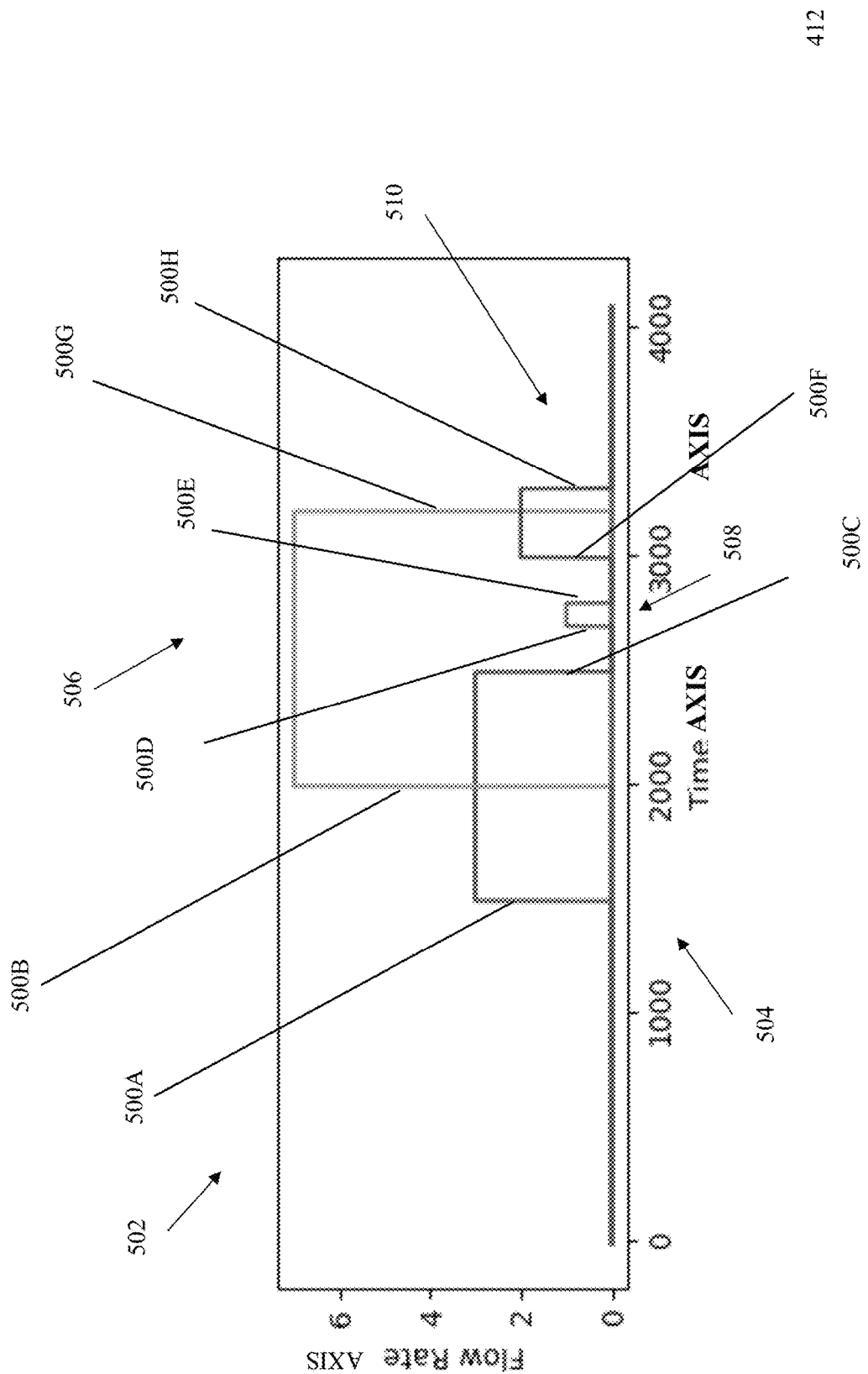
FIG. 5B is a notional representation of a combination of possible distinct combined event instances that are components of the first compound event instance of FIG. 5A.

FIG. 5B is a compound representation 502 presenting a combination four distinct representations 504, 506, 508 & 520 of four event instances that are components of the first compound event instance of the first compound visual representation 500. FIGS. 4A through 5B are thus included in the disclosure to illustrate the relevance of the optional object of the invented method in distinguishing compound event instances from singular instances on complex events.

Figure 6:
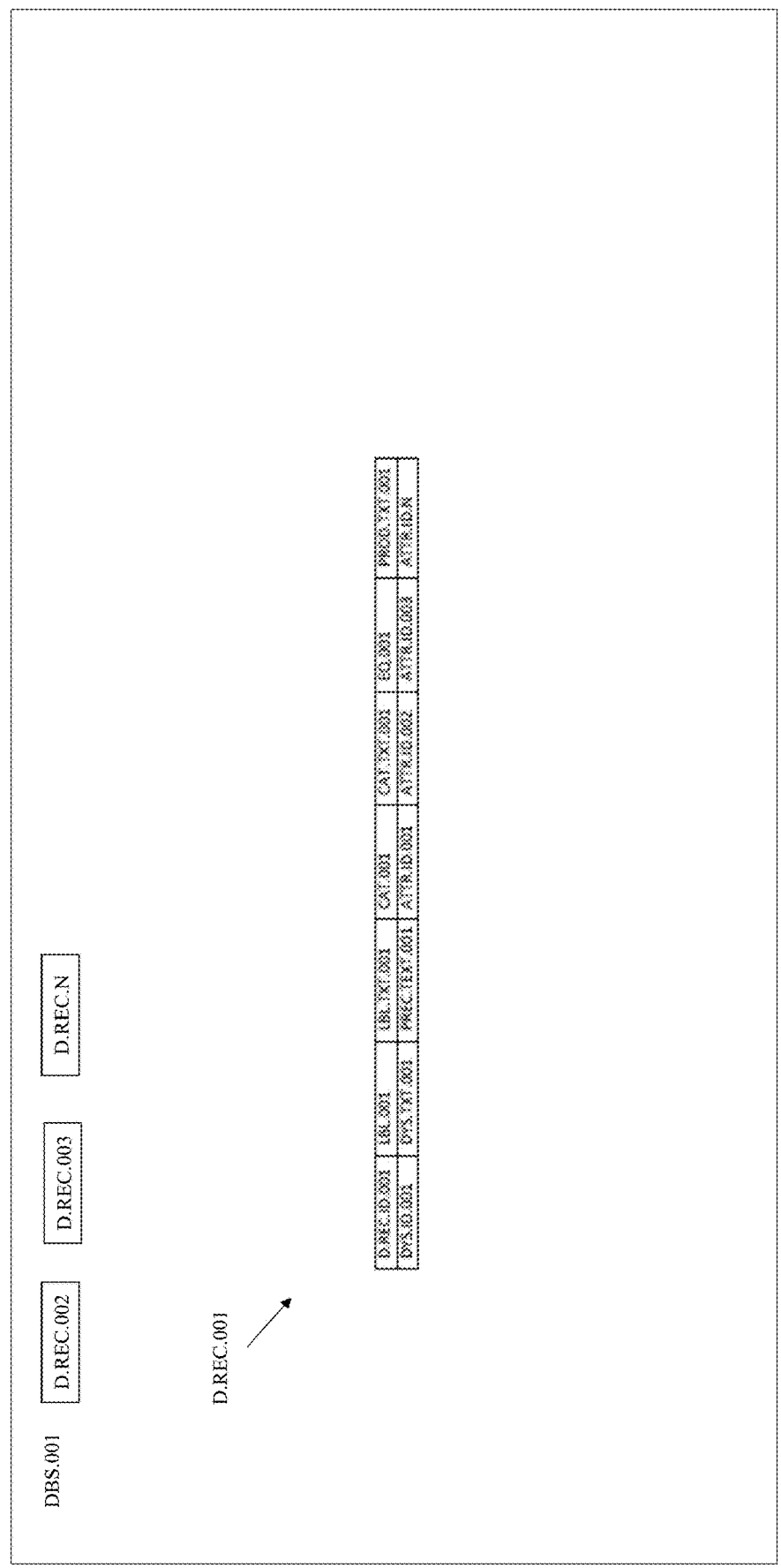
FIG. 6 is a detailed block diagram of a first data base of FIG. 2C and featuring an exemplary event definition record of a first database of the device memory of FIG. 2B.
Figure 7:
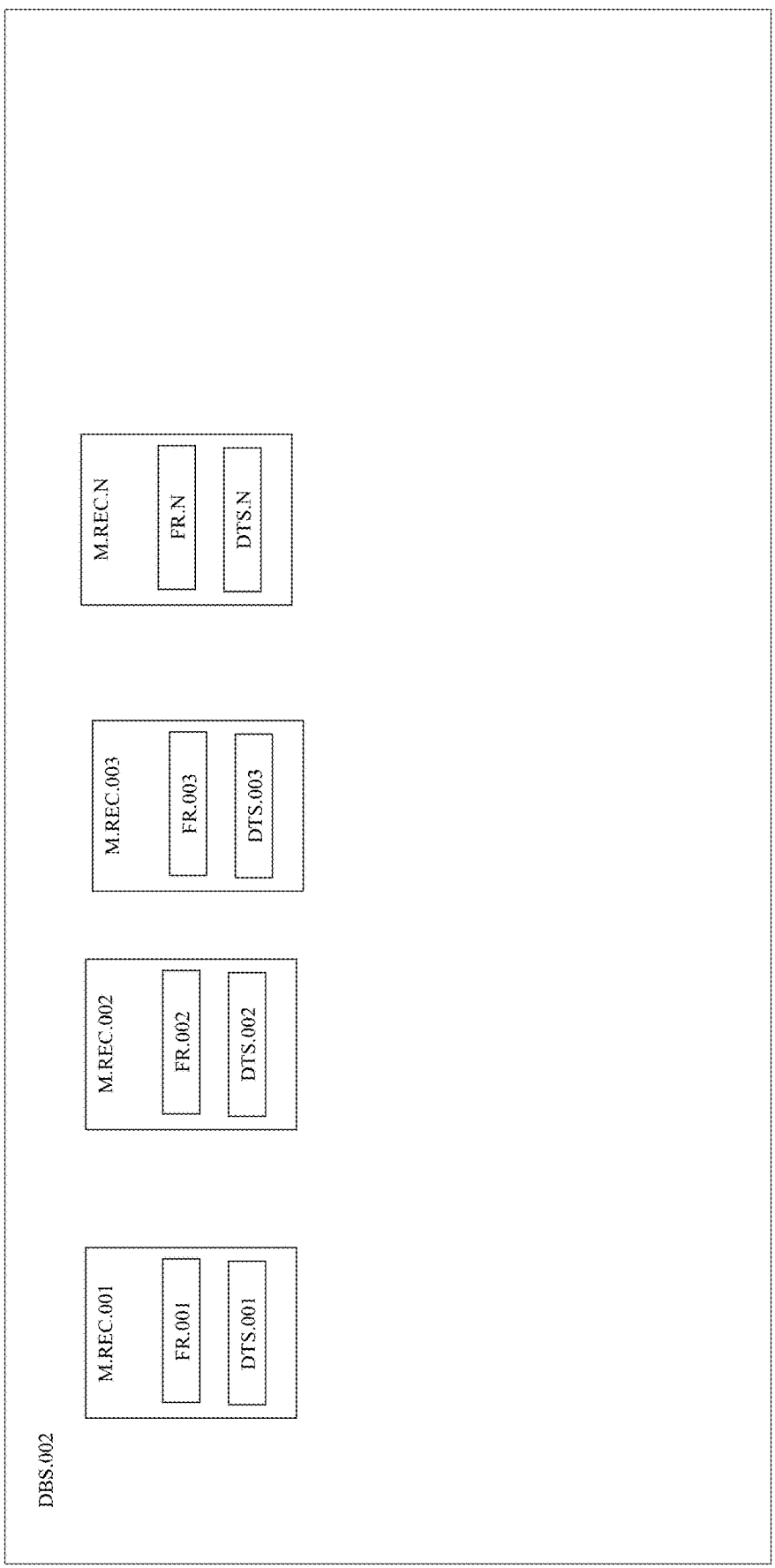
FIG. 7 is a detailed block diagram of a second data base of FIG. 2C and featuring an exemplary flow rate measurement record of a second database of the device memory of FIG. 2B.

FIG. 6 is a detailed block diagram of the first database DBS.001 and presents an exemplary first event definition record D.REC.001 of the plurality of event definition records D.REC.001-D.REC.N of the first database DBS.001 of the device memory 100G of FIG. 2B.

The exemplary first event definition record D.REC.001 includes a first event definition record identifier D.REC.ID.001. The first event definition record D.REC.001 may additionally optionally include a first label LBL.001, a corresponding first label text LBL.TXT.001, a first category marker CAT.001, a first category text CAT.TXT.001, a first equipment type identifier EQ.001, a first product name PROD.TXT.001, a first product dysfunction identifier DYS.ID.001, a first product dysfunction text DYS.TXT.001 a first, product recommendation text PREC.TEXT.001, and/or one or more attribute identifiers ATTR.ID-001-ATTR.ID.N.

It is understood that the one or more attribute identifiers ATTR.ID.001-ATTR.ID.N may indicate, describe and/or comprise an attribute, a digitized representation of an attribute, and/or a value of an attribute, selected from the group of attributes and attribute values including, but not limited to, (a.) a flow parameter group consisting of a flow duration value, an average flow rate value, and a fluid volume value, (b.) a temporal parameter group consisting of a time stamp value, an hour value of a nominal day, a day identifier of a nominal week, and a day and month value of a nominal year, (c.) a fluid flow shape parameter group consisting of a measure of consistency of flow volume, a ramp-up measurement, a ramp-down measurement, and a burstiness value, (d.) a probabilistic parameter of the plumbing system selected from the probabilistic parameter group consisting of a value of relatively frequency of occurrence of a particular duration, a value of relatively frequency of occurrence of a flow rate value, and a value of relatively frequency of occurrence of a fluid volume of the plumbing system, and/or (e.) a stochastic parameter of the plumbing system 108 selected from the stochastic parameter group consisting of a value of relatively frequency of occurrence of a selected event at a particular time of day and a value of relatively frequency of occurrence of a selected event at a particular day.

It is even further understood that the one or more attribute identifiers ATTR.ID.001-ATTR.ID.N may indicate, describe, and/or comprise an attribute, and/or a value or digital representation of an attribute, selected from the group of attributes and attribute values including, but not limited to, (1.) waveform area (volume); (2.) waveform perimeter (duration); (3.) total variation of the derived waveform; (4.) statistical moments of the derived waveform (mean, variation, skewness, kurtosis); (5.) waveform representations, i.e. Fourier coefficients or wavelet coefficients; (6.) spectral or vibration characteristics, e.g. generalized waveform coefficients; and/or (7.) subsequence or partial waveform matching.

Figure 8:
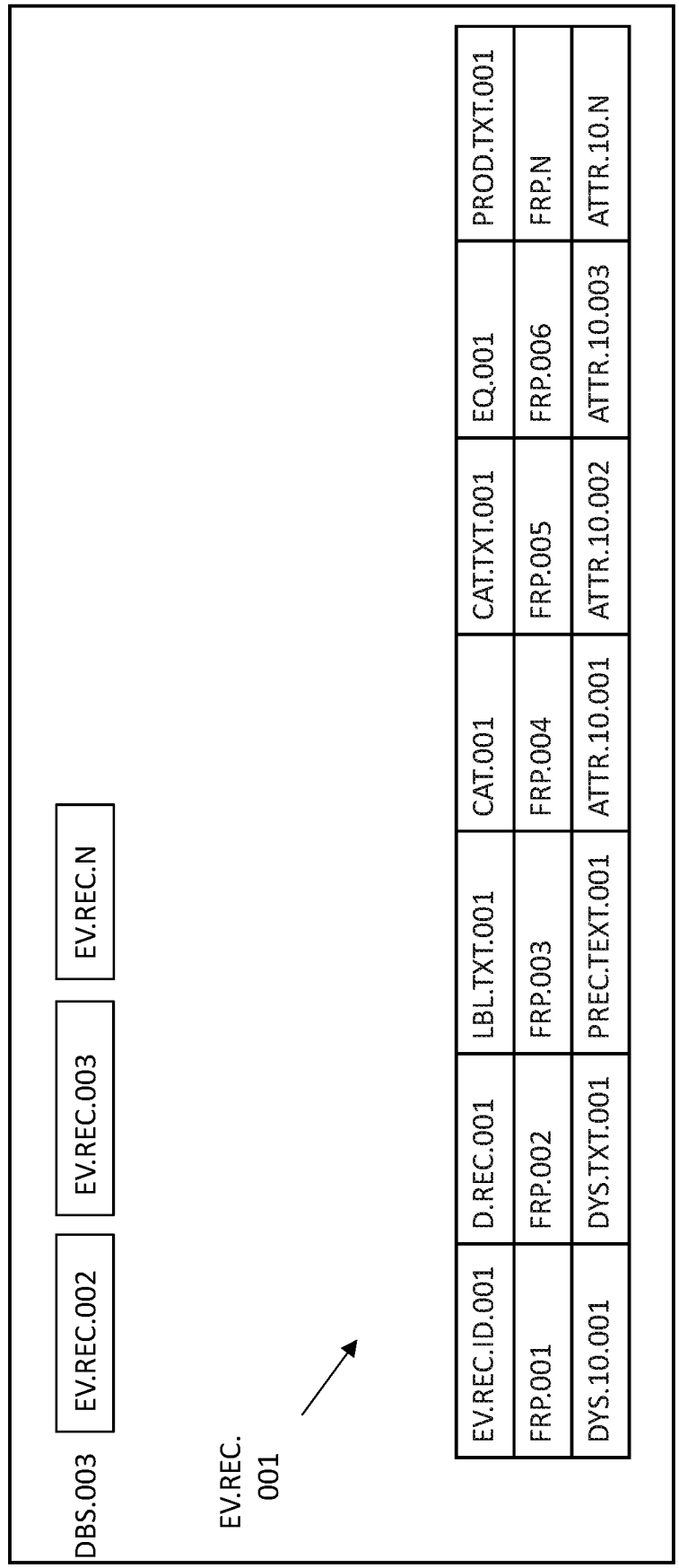
FIG. 8 is a detailed block diagram of a third data base of FIG. 2C and featuring an exemplary event instance record of a third database of the device memory of FIG. 2B.

FIG. 8 is a detailed block diagram of the third database DBS.003 and presents an exemplary first event instance record EV.REC.001 the device memory 100G of FIG. 2B. The first event instance record EV.REC.001 includes a first event instance record identifier EV.REC.ID.001 and a plurality of measurement pairs FRP.001-FRP.N of fluid flow measurement data. Each fluid flow measurement pair measurement pairs FRP.001-FRP includes a single fluid flow measurement FR.001FR.N and an associated date time stamp DTS.001-DTS.N. The first event instance record EV.REC.001 may additionally, alternatively, or optionally include an event definition record D.REC.ID.001-D.REC.ID.N, a label LBL.001-LBL.N, a label text LBL.001-LBL.N a category marker CAT.001-CAT.N, a category text CAT.TXT.001-CAT.TXT.N, an equipment type identifier EQ.001-EQ.N, a product name TXT PROD.TXT.001-PROD.TXT.N, a product dysfunction identifier DYS.ID.001, product dysfunction text DYS.TXT.001-DYS.TXT.N, a product recommendation text PREC.TXT.001-PREC.TXT.N, and/or one or more attribute identifiers ATTR.ID-001-ATTR.ID.N.

Figure 9:
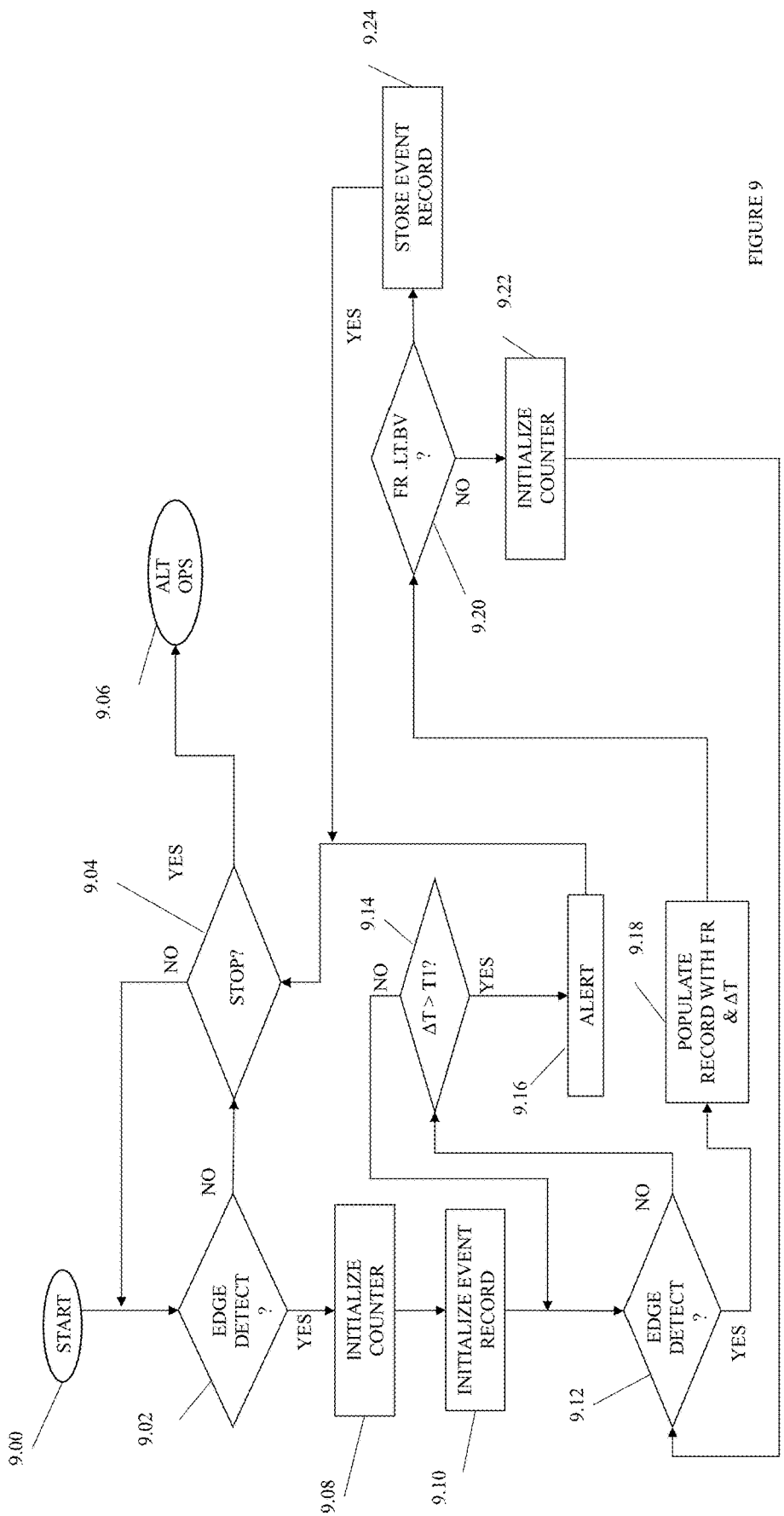
FIG. 9 is a flowchart of a first preferred embodiment of the invented method as implemented by either the first preferred embodiment of the invented system of FIG. 1 or the alternate preferred embodiment of the invented system of FIG. 2C.

FIG. 9 is a flowchart of a first preferred embodiment of the invented method as implemented by either the first device 100 or the alternate preferred embodiment of the invented system 200. For the sake of clarity of explanation, the present disclosure will refer to first device 100 in the description of the process of FIG. 9, and it is understood that the alternate preferred embodiment of the invented system 200 may equally perform some or all of the aspects and actions of the method of FIG. 9.

In step 9.00 the first device 100 powers up and accepts information as transmitted form the sensing appliance sensing appliance 102. In step 9.02 the first device 100 determines if the sensing appliance 102 has sent a fluid flow value FR.001-FR.N that indicates a detection of an edge that is above a threshold baseline fluid flow value BV. If the first device 100 does not detect receipt of a fluid flow value FR.001-FR.N above a threshold fluid flow value, then the first device 100 proceeds on step 9.04 and determines whether to return to another execution of step 9.02 or in the alternative proceeds on to alternate operations of step 9.06.

When the first device 100 determines in step 9.02 that a fluid flow value FR.001-FR.N above a threshold fluid flow value has been received, the x110 proceeds on step 9.08 and initializes an event time counter, and in step 9.10 further initializes an event record EV.REC.001-EV.REC.N. For the sake of clarity of explanation and not offered or intended as limitation, the present disclosure will refer to the exemplary first event record EV.REC.001 in the discussion of the processes of FIGS. 9, 10 and 11. In step 9.10 the first device 100 populates the first event record EV.REC.001 with a newly received first flow rate value FR.001 and a newly received first date time data DTS.001 as received from the sensing appliance 102.

In step 9.12 the first device 100 determines next if the sensing appliance 102 has sent a fluid flow value FR.001-FR.N that indicates a new detection of a new edge that is above a threshold fluid flow value. When no new detection of a new edge is determined in step 9.12, the first device 100 proceeds on to step 9.14 to determine if a time length constant T1 has been exceeded as indicated by a current value of the event time counter, wherein an alert is issued by the first device 100 in step 9.16 when time length constant T1 has been exceeded as determined by the first device 100 in step 9.14. The first device 100 proceeds form step 9.16 to step 9.04. In the alternative, when the finding of step 9.14 is negative, the first device 100 proceeds form step 9.14 to an additional execution of the step 9.12.

When a new detection of a new edge is determined in step 9.12 by the first device 100, the first device 100 proceeds to step 9.18 and populates the first event record EV.REC.001 with a flow rate pair FRP.001-FRP.N that includes a newly received flow rate value FR.002-FR.N and a newly received date time data DTS.002-DTS.N.

The first device 100 proceeds from step 9.18 to step 9.20 and determines whether the last received flow rate value FR.002-FR.N is less than the baseline flow rate vale BV. When the first device 100 proceeds determines in step 9.20 that the last received flow rate value FR.002-FR.N is more than or equal to the baseline flow rate vale BV, the first device 100 proceeds on to step 9.22 and to reinitialize the time counter and thereupon proceeds onto an additional execution of step 9.12.

In the alternative, when the first device 100 proceeds determines in step 9.20 that the last received flow rate value FR.002-FR.N is less than the baseline flow rate vale BV, the first device 100 proceeds on to step 9.24 and stores the first event record EV.REC.001. The first device 100 proceeds from step 9.22 onto an additional execution of step 9.04.

Figure 10:
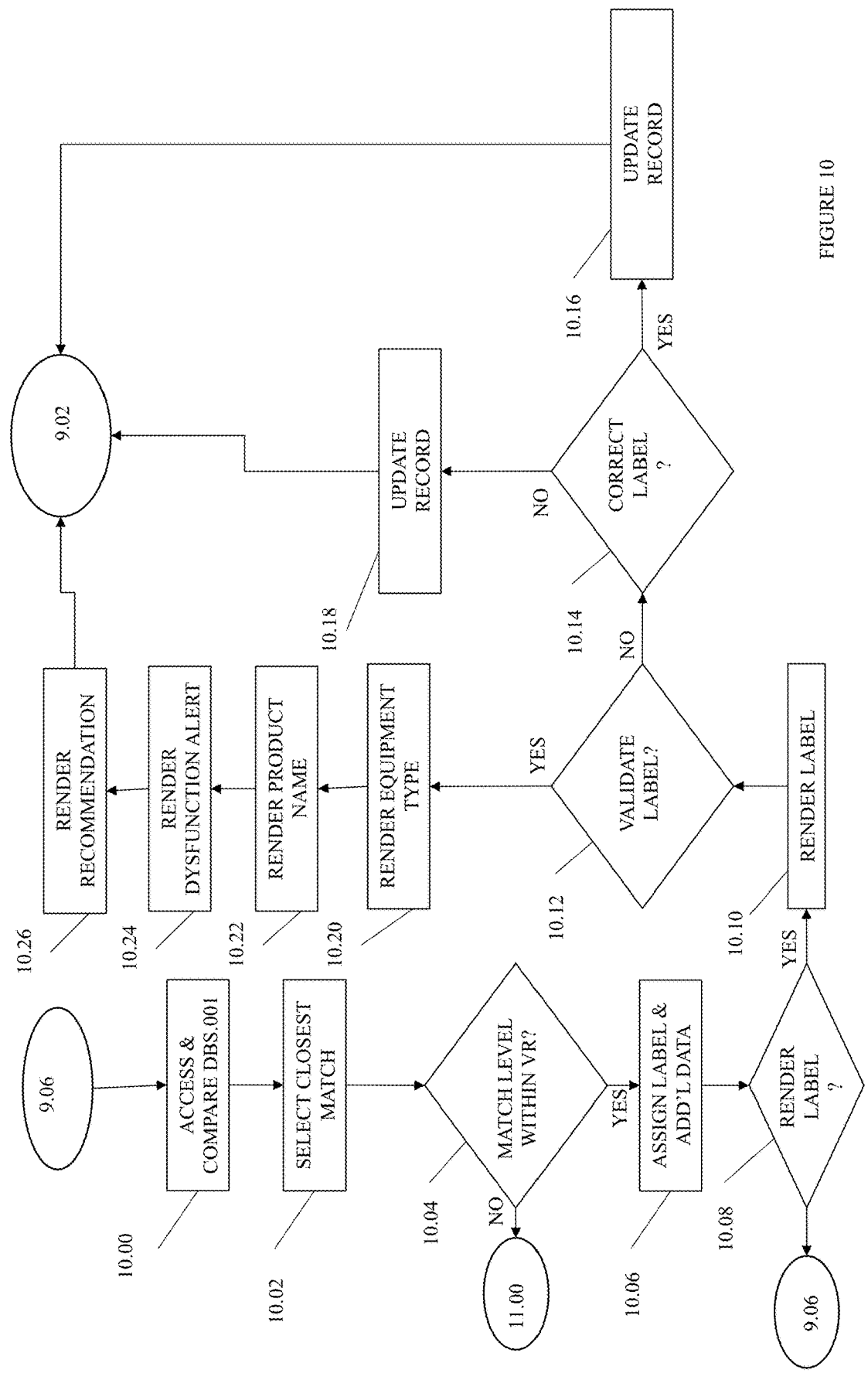
FIG. 10 is a flowchart of additional optional aspects of the first preferred embodiment of the invented method as implemented by either the first preferred embodiment of the invented system of FIG. 1 or the alternate preferred embodiment of the invented system of FIG. 2C.

FIG. 10 is a flowchart of additional optional aspects of the first preferred embodiment of the invented method as implemented by either the first device 100 or the alternate preferred embodiment of the invented system 200. For the sake of clarity of explanation, the present disclosure will refer to first device 100 in the description of the process of FIG. 10, and it is understood that the alternate preferred embodiment of the invented system 200 may equally perform some or all of the aspects and actions of the method of FIG. 10.

In step 10.00 the first device 100 accesses the library event definition records D.REC.001-D.REC.N of the first database DBS.001 and evaluates for a match the informational content and attributes of each event definition record D.REC.001-D.REC.N with the informational content and attributes of the first event record EV.REC.001. In step 10.02 the first device 100 selects the closest matching event definition record D.REC.001-D.REC.N as determined in step 10.00. The first device 100 determines in step 10.04 whether the closest record match as selected in step 10.02 is within an acceptable variance range VR. When first device 100 determines in step 10.04 that the closest record match as selected in step 10.02 is outside of the acceptable variance range VR, the first device 100 proceeds on to step 11.00 of FIG. 11.

In the alternative, when first device 100 determines in step 10.04 that the closest record match as selected in step 10.02 is within the acceptable variance range VR, the first device 100 proceeds to write the label identifier LBL.TXT.001 of the event definition record D.REC.001-D.REC.N selected in step 10.02. It is understood that additional information sourced from the event definition record D.REC.001-D.REC.N selected in step 10.02 may be written into the first event record EV.REC.001 by the first device 100.

In step 10.08 the first device 100 determines whether to render the label text LBL.TXT.001 by means of the display screen 100A. When the first device 100 determines in step 10.08 not to render the label text LBL.TXT.001, the first device 100 proceeds from step 10.08 to step 9.06. In the alternative, when the first device 100 determines in step 10.08 to render the label text LBL.TXT.001, the first device 100 proceeds from step 10.08 to step 10.10 and renders the label text LBL.TXT.001 by means of the display screen 100E.

In optional step 10.12 the first device 100 queries a user via the output module to request validation or revision of the label text LBL.TXT. When the first device 100 determines in step 10.12 to have received an information, via the input module 100C or via the network 116, that the label text LBL.TXT.001 is not valid, the first device 100 proceeds on to step 10.14 and requests an instruction to correct and revise the label txt LBL.TXT.001 as stored in the first event record EV.REC.001. When the first device 100 receives an instruction, via the input module 100C or the network 116 in step 10.14, to correct and revise the label text LBL.TXT.001 as stored in the first event record EV.REC.001, the first device 100 proceeds on to step 10.16 and revises the first event record EV.REC.001 in accordance with instruction received in step 10.14. In the alternative, when the first device 100 does not receive an instruction to correct and revise the label text LBL.TXT.001 as stored in the first event record EV.REC.001, the first device 100 proceeds from step 10.14 on to optional step 10.18 and notes in the first event record EV.REC.001 the notice of invalidity of label text LBL.TXT.001 as currently stored in the first event record EV.REC.001. The first device 100 proceeds from either step 10.16 or step 10.18 to step 9.02.

Referring now to step 10.12, when the first device 100 determines in step 10.12 to have received an information, via the input module 100C or via the network 116, that the label text LBL.TXT.001 is valid, the first device 100 proceeds on execute one or more optional step 10.20 through 10.26, wherein additional information is rendered via the display screen 100E. More particularly, the first device 100 renders in optional step 10.20 renders equipment type EQ.001 via the display screen 100E. Additionally or alternatively, the first device 100 renders in optional step 10.22 renders the product name PROD.TXT.001 via the display screen 100E. Still additionally or alternatively, the first device 100 renders in optional step 10.24 renders the dysfunction text DYS.TXT.001 via the display screen 100E. Yet additionally or alternatively, the first device 100 renders in optional step 10.24 renders the dysfunction text DYS.TXT.001 via the display screen 100E.

The first device 100 proceeds from either step 10.12 or step 10.20 through 10.26 to an additional execution of step 9.02.

Figure 11:
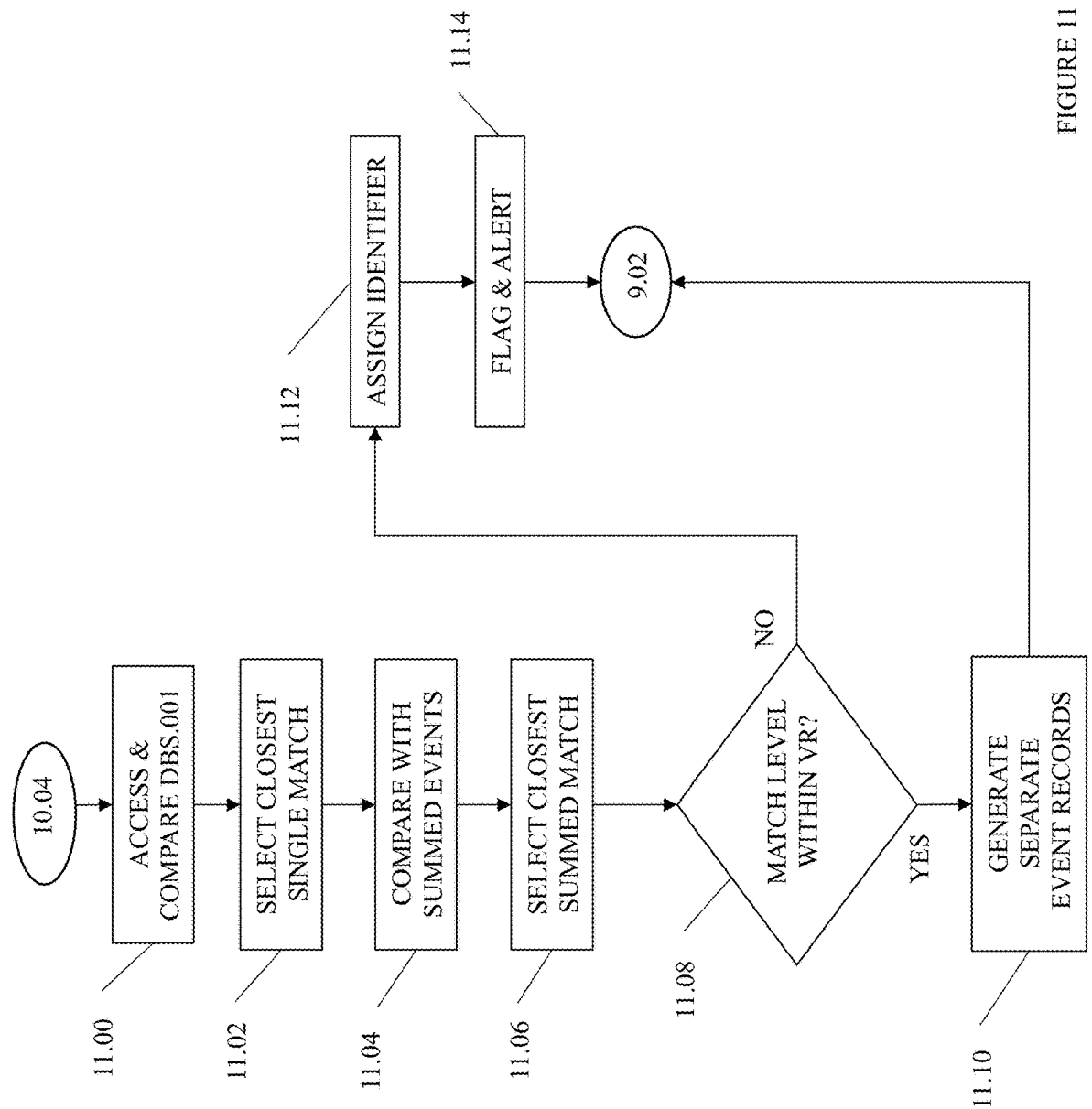
FIG. 11 is a flowchart of still additional optional aspects of the first preferred embodiment of the invented method as implemented by either the first preferred embodiment of the invented system of FIG. 1 or the alternate preferred embodiment of the invented system of FIG. 2C.

FIG. 11 is a flowchart of still additional optional aspects of the first preferred embodiment of the invented method as implemented by either the first preferred embodiment of the invented system of FIG. 1 or the alternate preferred embodiment of the invented system of FIG. 2C.

In step 11.00 the first device 100 accesses the library event definition records D.REC.001-D.REC.N of the first database DBS.001 and evaluates for a match the informational content and attributes of each event definition record D.REC.001-D.REC.N with the informational content and attributes of the first event record EV.REC.001. In step 11.02 the first device 100 selects the closest matching event definition record D.REC.001-D.REC.N as determined in step 10.00. The first device 100 next compares matches of the attributes of additional event definition records D.REC.001-D.REC.N in combination with the event definition record D.REC.001-D.REC.N selected in step 11.02.

In step 11.06 the first device 100 selects the closest matching combination of event definition records D.REC.001-D.REC.N as determined in step 10.04. The first device 100 determines in step 11.08 whether the closest combined record match as selected in step 11.06 is within the acceptable variance range VR.

When the first device 100 determines in step 11.08 that the closest record match as selected in step 11.02 is within the acceptable variance range VR, the first device 100 proceeds on to generate two or more event records EV.002-EV.N in step 11.10, wherein each event record EV.REC.002-EV.N newly generated in step 11.10 is separately associated, in a one-to-one correspondence, with an individual event definition record EV.REC.001-EV.REC.N selected in step 11.06. The first device 100 proceeds from step 11.10 to an additional execution of step 9.02.

In the alternative, when the first device 100 determines in step 11.08 that the closest combined record match as selected in step 11.06 is outside of the acceptable variance range VR, the first device 100 proceeds on to step 11.12. In optional step 11.12 the first device 100 assigns an identifier to the first event record EV.REC.001 that the first event record EV.REC.001 has not been successfully associated with any event definition record D.REC.001-D.REC.N; and in optional step 11.14 flags the first event record EV.REC.001 and issues an alert via the output module 100D indicating that the first event record EV.REC.001 that the first event record EV.REC.001 has not been successfully associated with any event definition record D.REC.001-D.REC.N. The first device 100 proceeds from step 11.08 or optional step 11.12 or optional step 11.14 to an additional execution of step 9.02.

It is understood that in various alternate preferred embodiments of the method of the present invention that the sensing appliance 102 may further comprise some or all of the aspects and elements of the first device 100, wherein one or all of the steps and aspects of the methods of the Figures are performable and executed by the sensing appliance 102. It is understood that in other various alternate preferred embodiments of the method of the present invention that the first device 100 may further comprise some or all of the aspects and elements of the sensing appliance 102, wherein one or all of the steps and aspects of the methods of the Figures are performable and executed by the first device 100.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

One or more of the aspects or steps, optional or essential, invented method may be implemented as software, firmware, hardware, module or engine. In one embodiment, the previous invented method description may be implemented by the general purpose processor 102 in the device 100 to achieve the previously desired functions. In one embodiment, the invented method may be implemented as an engine or module which may include modules as subcomponents. In other embodiments, features of one or more of the described subcomponents may be combined or partitioned into different individual components, modules or engines.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in data processing device containing hardware (e.g., hardware), software (e.g., the device software DEV.SW), a firmware, e.g., the device firmware DEV.FW, or any combination thereof. If implemented in software as a computer program product, the functions or modules may be stored on or transmitted over as one or more instructions or code on a computer-readable media (e.g., non-transitory machine-readable storage medium). Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A computer-implemented method to acquire and characterize fluid flow information, comprising:
    generating a plurality of time series flow rate measurements at a point of a plumbing system;
    storing the plurality of time series flow rate measurements in a tangible medium;
    determining that an event has started by at least detecting a first change in a magnitude of the flow rate measurements;
    determining that the event has concluded based on the magnitude of the flow rate measurements;
    associating a plurality of time series flow rate measurements in an event record in response to determining that the event has concluded;
    deriving a plurality of event attributes from the plurality of time series flow rate measurements;
    storing the event record when the respective flow rate is less than or equal to a baseline flow rate value;
    comparing the stored event record with each of a plurality of attributes sets, wherein each attributes set of the plurality of attributes sets is derived from an individual event definition in a library of stored event definitions;
    determining a closest matching attributes set in comparison with the event attributes; and
    associating the stored event record with an event type identifier based on the closest matching attributes set; and
    determining that the event has concluded by at least determining that a combination of changes in magnitude of the flow rate measurements satisfies a subset sum problem.

2. The method of claim 1, wherein the stored plurality of time series flow rate measurements is associated with a label referenced by the closest matching attributes set.

3. The method of claim 1, wherein generating the plurality of time series flow rate measurements comprises generating, by a sensor appliance, the plurality of time series flow rate measurements, the method further comprising:
    receiving, by a remote device, the plurality of time series flow rate measurements; and
    storing, by the remote device, the plurality of time series flow rate measurements.

4. The method of claim 1, further comprising associating the event type identifier with an equipment type.

5. The method of claim 1, further comprising associating the event type identifier with an equipment dysfunction.

6. The method of claim 1, further comprising associating the event type identifier with a recommendation.

7. A device comprising:
    processing circuitry;
    a wireless interface communicatively coupled with the processing circuitry, the wireless interface configured to receive flow rate measurements from a flow rate monitoring sensor configured to sense a flow rate at a location of a plumbing system; and
    a memory communicatively coupled with the processing circuitry and the wireless interface, the memory storing a library of event definitions received prior to receipt of the flow rate measurements from the flow rate monitoring sensor,
    wherein the processing circuitry is configured to:
        determine that an event has started by at least detecting a first change in the magnitude of the flow rate measurements;

determine that the event has concluded based on the magnitude of the flow rate measurements;

associate a plurality of time series flow rate measurements in an event record in response to determining that the event has concluded;

derive a plurality of event attributes from the plurality of time series flow rate measurements;

individually compare the event attributes with each of a plurality of attributes sets, wherein each attributes set of the plurality of attributes sets is derived from an individual event definition of the library of event definitions;

determine a closest matching attributes set in comparison with the event attributes;

associate the event record with an event type identifier that is associated with the closest matching attributes set; and determine that the event has concluded by at least determining that a combination of changes in magnitude of the flow rate measurements satisfies a subset sum problem.

8. The device of claim 7,
wherein the device further comprises input circuitry communicatively coupled with the memory, and
wherein the processing circuitry is configured to revise the event type identifier based on a user input received via the input circuitry.

9. The device of claim 7, wherein the processing circuitry is further configured to:
individually compare the stored event record with each of a plurality of combined attributes sets, wherein each combined attributes set is derived from a combination of at least two event definitions of the library of event definitions; and
determine a closest matching combined attributes set in comparison with the stored event record.

10. The device of claim 9, wherein the processing circuitry is further configured to associate the stored event record with the event type identifier of a compound event.

11. The device of claim 9, wherein the processing circuitry is further configured to form a first derivative event record, the first derivative event record associated with a first event type identifier associated with one of the attributes set included within the closest matching combined attributes set.

12. The device of claim 11, wherein the processing circuitry is further configured to form a second derivative event record, the second derivative event record associated with a second event type identifier associated with an additional attributes set included within the closest matching combined attributes set.

13. The device of claim 7, wherein the event type identifier is associated with an equipment type.

14. The device of claim 7, wherein the event type identifier is associated with an equipment product name.

15. The device of claim 14, wherein the event type identifier is associated with a dysfunction of an equipment model.

16. The device of claim 15, wherein the event type identifier is associated with a recommendation.

17. The device of claim 7, wherein the processing circuitry is configured to:
determine that a fluid flow rate measurement of the plurality of time series flow rate measurements is above a threshold value;
initialize a time counter in response to determining that the fluid flow rate measurement is above the threshold value;
determine that a current value of the time counter is greater than or equal to a time length constant after initializing the time counter; and
issue an alert in response to determining that the current value of the time counter exceeds the time length constant.

18. The device of claim 7, wherein the processing circuitry is configured to:
determine a variance for the closest matching attributes set,
determine, when the variance is outside a variance range, an additional matching attributes set in comparison with the variance, wherein the additional matching attributes set is derived from an additional individual event definition of the library of event definitions, and
associate the event record with the event type identifier that is associated with the closest matching attributes set and the event type identifier that is associated with the additional matching attributes set.

19. The device of claim 7, wherein the processing circuitry is configured to:
assign, to data associated with the event, a time of day parameter; and
assign, to data associated with the event, a frequency of occurrence of the event type identifier at the assigned time of day parameter.

* * * * *